US011055561B2

(12) United States Patent
Song et al.

(10) Patent No.: US 11,055,561 B2
(45) Date of Patent: Jul. 6, 2021

(54) SIMILAR PICTURE IDENTIFICATION METHOD, DEVICE, AND STORAGE MEDIUM

(71) Applicant: Tencent Technology (Shenzhen) Company Limited, Shenzhen (CN)

(72) Inventors: Xiangyu Song, Shenzhen (CN); Wei He, Shenzhen (CN); Guizhou Huang, Shenzhen (CN); Dean Guo, Shenzhen (CN); Qiquan Jiang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 42 days.

(21) Appl. No.: 16/548,301

(22) Filed: Aug. 22, 2019

(65) Prior Publication Data

US 2019/0377971 A1     Dec. 12, 2019

Related U.S. Application Data

(63) Continuation of application No. PCT/CN2018/086911, filed on May 15, 2018.

(30) Foreign Application Priority Data

Jun. 13, 2017   (CN) .......................... 201710444106.4

(51) Int. Cl.
*G06K 9/62* (2006.01)
*G06K 9/46* (2006.01)

(52) U.S. Cl.
CPC ......... *G06K 9/6201* (2013.01); *G06K 9/4604* (2013.01); *G06K 2009/6213* (2013.01)

(58) Field of Classification Search
CPC .............. G06K 9/6201; G06K 9/4604; G06K 2009/6213; G06K 9/34; G06K 9/6215; G06K 2009/4666
See application file for complete search history.

(56) References Cited

U.S. PATENT DOCUMENTS

| 9,208,548 | B1* | 12/2015 | Noble | ................. G06F 16/5866 |
| 2009/0324100 | A1* | 12/2009 | Kletter | ............... G06F 16/5838 |
| | | | | 382/217 |

(Continued)

FOREIGN PATENT DOCUMENTS

| CN | 103810488 A | 5/2014 |
| CN | 104036281 A | 9/2014 |
| CN | 104318259 A | 1/2015 |

OTHER PUBLICATIONS

PCT International Search Report with PCT Written Opinion of the International Searching Authority dated Jul. 31, 2018 in PCT/CN2018/086911—8 pages.

*Primary Examiner* — Dhaval V Patel

(74) *Attorney, Agent, or Firm* — Oblon, McClelland, Maier & Neustadt, L.L.P.

(57) ABSTRACT

A similar picture identification method is described. According to the method, processing circuitry of a device obtains n first local regions of a first picture, the n first local regions being a first set of regions that is affine invariant, and obtains m second local regions of a second picture, the m second local regions being a second set of regions that is affine invariant. The processing circuitry obtains n first characteristic values respectively corresponding to the n first local regions, and obtains m second characteristic values respectively corresponding to the m second local regions. The processing circuitry further determines, according to a comparison result of the n first characteristic values and the m second characteristic values, whether the first picture is similar to the second picture, where n and m are positive integers.

19 Claims, 12 Drawing Sheets

(56) References Cited

U.S. PATENT DOCUMENTS

| | | | |
|---|---|---|---|
| 2014/0368689 A1* | 12/2014 | Cao .......................... | G06K 9/52 |
| | | | 348/222.1 |
| 2016/0117347 A1 | 4/2016 | Nielsen et al. | |
| 2016/0117830 A1* | 4/2016 | Salahat ................... | G06T 7/248 |
| | | | 382/154 |

* cited by examiner

| Data Point 00 | Data Point 01 | Data Point 02 |
|---|---|---|
| 1 | 2 | 3 |
| Data Point 10 | Data Point 11 | Data Point 12 |
| 4 | 5 | 6 |
| Data Point 20 | Data Point 21 | Data Point 22 |
| 7 | 8 | 9 |

(a)

| Data Point 00 | Data Point 01 | Data Point 02 |
|---|---|---|
| 0 | 0 | 0 |
| Data Point 10 | Data Point 11 | Data Point 12 |
| 0 | 0 | 1 |
| Data Point 20 | Data Point 21 | Data Point 22 |
| 1 | 1 | 1 |

(b)

SIMILAR PICTURE IDENTIFICATION METHOD, DEVICE, AND STORAGE MEDIUM

RELATED APPLICATION

This application is a continuation of International Application No. PCT/CN2018/086911, filed on May 15, 2018, which claims priority to Chinese Patent Application No. 201710444106.4, entitled "SIMILAR PICTURE IDENTIFICATION METHOD AND COMPUTER DEVICE" filed on Jun. 13, 2017. The entire disclosures of the prior applications are hereby incorporated by reference in their entirety.

FIELD OF THE TECHNOLOGY

The embodiments of this application relate to the field of image processing technologies, and in particular, to a similar picture identification method, a device, and a storage medium.

BACKGROUND OF THE DISCLOSURE

With the development of information technologies, similar picture search is a popular topic in the field of information search and is usually used in picture search services or image copyright authentication services. The premise of similar picture search lies in identification of similar pictures.

In the related technology, a similar picture identification method includes obtaining, by a server, first characteristic values of a first picture and second characteristic values of a second picture on a basis of a preset algorithm, and then determining whether the two pictures are similar by comparing the first characteristic values and the second characteristic values. The first characteristic values and the second characteristic values may be hash values.

However, because the first characteristic values are used for representing feature information of the whole first picture, and the second characteristic values are used for presenting feature information of the whole second picture, the foregoing method is not applicable to similarity identification between an original picture and a processed picture. The processing described above may include cropping, scaling, adding a watermark identifier, or the like. Accordingly, the foregoing method may have a low dimension of detection space and a high error rate, which result in reduced accuracy in identifying similar pictures.

SUMMARY

According to various embodiments provided in this application, similar picture identification methods, devices, and non-transitory computer-readable storage mediums are provided.

According to one or more embodiments described in this disclosure, a similar picture identification method is provided. According to the method, processing circuitry of a device obtains n first local regions of a first picture, the n first local regions being a first set of regions that is affine invariant, and obtains m second local regions of a second picture, the m second local regions being a second set of regions that is affine invariant. The processing circuitry obtains n first characteristic values respectively corresponding to the n first local regions, and obtains m second characteristic values respectively corresponding to the m second local regions, the first characteristic values representing feature information of the first local regions, and the second characteristic values representing feature information of the second local regions. The processing circuitry further determines, according to a comparison result of the n first characteristic values and the m second characteristic values, whether the first picture is similar to the second picture, where n and m are positive integers.

According to one or more embodiments described in this disclosure, a similar picture identification method is provided. The method includes obtaining, by processing circuitry of a device, n first local regions of a first picture, the n first local regions being a first set of regions that is affine invariant, and obtaining, by the processing circuitry, m second local regions of a second picture, the m second local regions being a second set of regions that is affine invariant. The method includes obtaining, by the processing circuitry, n first characteristic values respectively corresponding to the n first local regions, and obtaining, by the processing circuitry, m second characteristic values respectively corresponding to the m second local regions, the first characteristic values representing feature information of the first local regions, and the second characteristic values representing feature information of the second local regions. The method further includes determining, according to a comparison result of the n first characteristic values and the m second characteristic values, whether the first picture is similar to the second picture, where n and m are positive integers.

According to one or more embodiments described in this disclosure, a similar picture identification apparatus is provided. The apparatus includes a first obtaining module, second obtaining module, a third obtaining module, and an identification module. The first obtaining module is configured to identify n first local regions of a first picture, the n first local regions being a first set of regions that is affine invariant. The second obtaining module is configured to identify m second local regions of a second picture, the m second local regions being a second set of regions that is affine invariant. The third obtaining module is configured to obtain n first characteristic values respectively corresponding to the n first local regions, and to obtain m second characteristic values respectively corresponding to the m second local regions, the first characteristic values representing feature information of the first local regions, and the second characteristic values representing feature information of the second local regions. The identification module is configured to determine, according to a comparison result of the n first characteristic values and the m second characteristic values, whether the first picture is similar to the second picture, n and m being positive integers.

According to one or more embodiments described in this disclosure, a computer device is provided. The computer device includes processing circuitry configured to obtain n first local regions of a first picture, the n first local regions being a first set of regions that is affine invariant, and to obtain m second local regions of a second picture, the m second local regions being a second set of regions that is affine invariant. The processing circuitry is further configured to obtain n first characteristic values respectively corresponding to the n first local regions and to obtain m second characteristic values respectively corresponding to the m second local regions, the first characteristic values representing feature information of the first local regions, and the second characteristic values representing feature information of the second local regions. The processing circuitry is further configured to determine, according to a comparison result of the n first characteristic values and the m second characteristic values, whether the first picture is similar to the second picture, where n and m are positive integers.

According to one or more embodiments described in this disclosure, a method of determining picture key characteristics is provided. By processing circuitry of a device, key regions in one or more pictures are identified, fingerprints respectively corresponding to the picture key characteristics in the key regions are calculated, and the fingerprints and the key regions are grouped in association with the one or more pictures, respectively. A table that stores a result of the grouping is output.

In some embodiments, the identifying the key regions is performed according to a maximally stable extremal region (MSER) algorithm. In some embodiments, the calculating the fingerprints is performed according to a perceptual hash algorithm.

According to one or more embodiments described in this disclosure, a method of determining picture similarity is provided. By processing circuitry of a device, a first picture characteristic grouping of a first picture is derived by identifying first key regions in the first picture according to a maximally stable extremal region (MSER) algorithm, and first fingerprints respectively corresponding to the first key regions are calculated according to a perceptual hash algorithm. Also, a second picture characteristic grouping of a second picture is derived by identifying second key regions in the second picture according to the MSER algorithm, and second fingerprints respectively corresponding to the second key regions are calculated according to the perceptual hash algorithm. A hamming distance between the first picture characteristic grouping and the second picture characteristic grouping is calculated, and the picture similarity is determined according to the calculated hamming distance.

According to one or more embodiments described in this disclosure, a non-transitory computer-readable storage medium is provided. The non-transitory storage medium stores at least one instruction, which when executed by a processor, causes the processor to perform obtaining n first local regions of a first picture, the n first local regions being a first set of regions that is affine invariant, and obtaining m second local regions of a second picture, the m second local regions being a second set of regions that is affine invariant. The at least one instruction, which when executed by the processor, causes the processor to perform obtaining n first characteristic values respectively corresponding to the n first local regions, and obtaining m second characteristic values respectively corresponding to the m second local regions, the first characteristic values representing feature information of the first local regions, and the second characteristic values representing feature information of the second local regions. The at least one instruction, which when executed by the processor, further causes the processor to perform determining, according to a comparison result of the n first characteristic values and the m second characteristic values, whether the first picture is similar to the second picture, where n and m are positive integers.

The details of one or more embodiments of this application are disclosed in the following accompanying drawings and description as non-limiting examples. Other features, objectives, and advantages of this application may be explicitly or implicitly illustrated in the specification, the accompanying drawings, and the claims.

DESCRIPTION OF EMBODIMENTS

Figure 1:
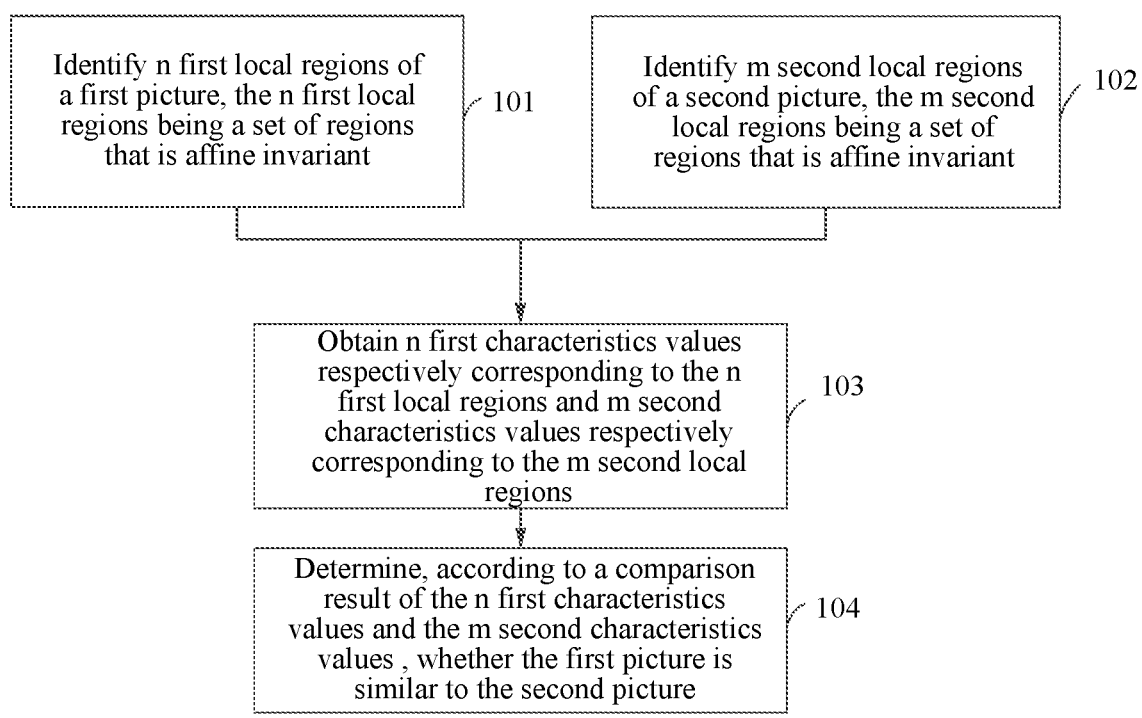
FIG. 1 is a flowchart of a similar picture identification method according to an embodiment of the present application.

To make objectives, technical solutions, and advantages of this application clearer, the following further describes in detail implementations of the present disclosure with reference to the accompanying drawings and embodiments. It should be understood that the specific embodiments described herein are only used to describe various aspects of this application, and are not for limiting the scope of this application.

Several terms described in this application are introduced as follows:

1. First picture: one of a to-be-detected picture and an original picture.

2. Second picture: the other of the to-be-detected picture and the original picture.

The to-be-detected picture may be an unprocessed picture or may be a picture obtained by processing the original picture. The to-be-detected picture includes but is not limited to, the following examples:

(1) a picture obtained by cropping the original picture;
(2) a picture obtained by compressing or stretching the original picture at equal proportions;
(3) a picture obtained by compressing or stretching the original picture at unequal proportions; or (4) a picture obtained by performing other processing such as watermark adding or hue modification on the original picture.

In some embodiments, the original picture can be an unprocessed picture.

3. First local regions: a set of regions in the first picture that is affine invariant. In some embodiments, the first local regions are determined according to a maximally stable extremal region (MSER) algorithm.

4. Second local regions: a set of regions in the second picture that is affine invariant. In some embodiments, the second local regions are determined according to the MSER algorithm.

5. First characteristic values: the first characteristic values are used for representing feature information of the first local regions, respectively. In some embodiments, an $i^{th}$ first characteristic value is a perceptual hash value of an $i^{th}$ first local region, i being a positive integer. In this application, the characteristic values of a picture may be referred to as fingerprints of the picture.

6. Second characteristic values: the second characteristic values are used for representing feature information of the second local regions, respectively. In some embodiments, a $j^{th}$ second characteristic value is a perceptual hash value of a $j^{th}$ second local region, j being a positive integer. In this application, the characteristic values of a picture may be referred to as fingerprints of the picture.

In various embodiments of this application, as non-limiting examples for illustration purposes, the first picture is described as the to-be-detected picture, and the second picture is described as an original picture.

In some applications, a similar picture identification method may not be applicable to determining similarity between an original picture and a processed picture, where processed picture may be processed by cropping, scaling, adding a watermark identifier, or the like. Therefore, the embodiments of this application provide a similar picture identification method, a device, and a storage medium that can be applicable to determining similarity between an original picture and a processed picture.

In some examples, there are local regions in the processed picture that have an affine-invariant property (i.e., corresponding to a set of local regions that is affine invariant) regardless of which processing is performed on the picture. In the embodiments of this application, n first local regions of a first picture that have an affine-invariant property and m second local regions of a second picture that have an affine-invariant property can be identified, n first characteristic values respectively corresponding to the n first local regions and m second characteristic values respectively corresponding to the m second local regions are determined, each of the n first characteristic values and each of the m second characteristic values are compared, and whether the first picture is similar to the second picture is identified according to a comparison result. Accordingly, by extracting several local regions that have an affine-invariant property in two pictures, comparison of the two pictures is converted into comparison of characteristic values of two groups of local regions, so that the similar picture identification method has good crop resistance. In this way, a dimension of detection space is increased, and similar picture identification accuracy is also improved. Description is made below by using non-limiting embodiments.

Referring to FIG. 1, FIG. 1 is a flowchart of a similar picture identification method according to an embodiment of the present application. The similar picture identification method may be executed by a server or terminal having a picture identification capability. Description is made in the following embodiments by using the server as an execution body of the similar picture identification method. The method may include the following steps.

Step 101: Identify n first local regions of a first picture, the n first local regions being a first set of regions that is affine invariant.

In some embodiments, the terminal sends the to-be-detected first picture to the server, and the server obtains the first picture and identifies the n first local regions having an affine-invariant property from the first picture, n being a positive integer.

In some embodiments, the n first local regions are local regions dynamically determined in the first picture.

In some embodiments, region locations of the n first local regions of the first picture are uniformly distributed or distributed in a scattered manner. In some embodiments, at least two first local regions in the n first local regions overlap with each other.

In some embodiments, quantities of first local regions for different first pictures can be different.

For example, for a picture A1 as the first picture, the server can identify 15 first local regions of the picture A1; and for a picture A2 as the first picture, the server can identify 20 first local regions of the picture A2.

In some embodiments, locations of first local regions for different first pictures can be different.

In some embodiments, a region size of each of the n first local regions of the first picture is the same. In some embodiments, the region sizes of at least two first local regions can be different.

For example, the region size of each of the n first local regions of the first picture can be "64*64".

For another example, a region size of a smallest first local region of the n first local regions of the first picture can be "32*32", a region size of a largest first local region can be "200*200", and region sizes of other n−2 first local regions can be between "64*64" and "200*200".

In various embodiments, a region size or a picture size may be expressed as a dimension of the region/picture, a number of pixels in the region/picture, or a pixel length-width ratio of the region/picture. The term of region size or picture size is not limited to any one of these examples illustrated in the present application.

In some embodiments, a region shape of each of the n first local regions of the first picture is the same. In some embodiments, the region shapes of at least two first local regions can be different.

For example, the region shape of each of the n first local regions of the first picture is rectangular.

For another example, a region shape of at least one of the n first local regions of the first picture is rectangular, and a region shape of at least one first local region is oval. Because an MSER algorithm has very good crop resistance, in some embodiments, the server detects and identifies the n first local regions in the first picture according to the MSER algorithm.

In various embodiments, a quantity, locations, region sizes, and region shapes of the n first local regions are not limited to the examples illustrated in the present application.

Figure 2:
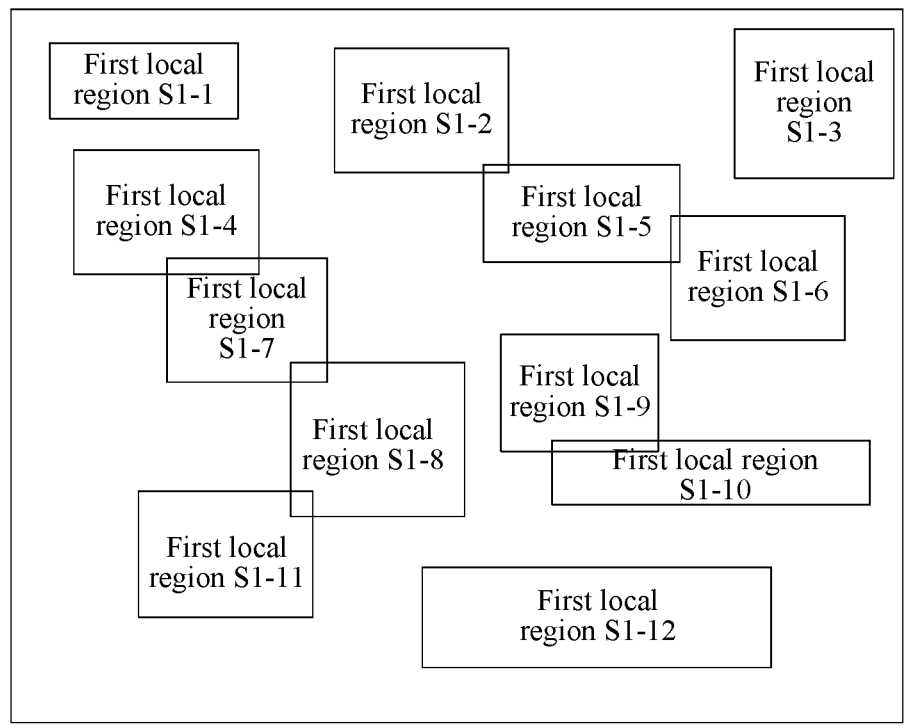
FIG. 2 is a diagram of n first local regions in a first picture according to an embodiment of the present application.

For example, as shown in FIG. 2, the server detects and identifies 12 first local regions, including a first local region S1-1 to a first local region S1-12, in the first picture A1 according to the MSER algorithm.

Step 102: Identify m second local regions of a second picture, the m second local regions being a second set of regions that is affine invariant.

In some embodiments, the server obtains the second picture, and the server identifies m second local regions having an affine-invariant property from the second picture, m being a positive integer.

In some embodiments, the m second local regions are local regions dynamically determined in the second picture.

In some embodiments, region locations of the m second local regions of the second picture are uniformly distributed or distributed in a scattered manner. In some embodiments, at least two second local regions in the m second local regions overlap with each other.

In some embodiments, quantities of second local regions for different second pictures can be different.

For example, for a picture B1 as the second picture, the server can identify 105 second local regions of the picture B1; and for a picture B2 as the second picture, the server can identify 200 second local regions of the picture B2.

In some embodiments, locations of second local regions for different second pictures can be different.

In some embodiments, a region size of each of the m second local regions of the second picture is the same. In some embodiments, the region sizes of at least two second local regions can be different.

For example, the region size of each of the m second local regions of the second picture can be "64*64".

For another example, a region size of a smallest second local region of the m second local regions of the second picture can be "32*32", a region size of a largest second local region can be "200*200", and region sizes of other m−2 second local regions can be between "64*64" and "200*200".

In some embodiments, a region shape of each of the m second local regions of the second picture is the same. In some embodiments, the region shapes of at least two second local regions can be different.

For example, the region shape of each of the m second local regions of the second picture is rectangular.

For another example, a region shape of at least one of the m second local regions of the second picture is rectangular, and a region shape of at least one second local region is oval.

In some embodiments, a quantity of the first local regions of the first picture and a quantity of the second local regions of the second picture can be equal or not equal. That is, n and m can be equal or different. In some embodiments, the server detects and identifies the m second local regions in the second picture according to the MSER algorithm.

In various embodiments, a quantity, locations, region sizes, and region shapes of the m second local regions are not limited to the examples illustrated in the present application.

Figure 3:
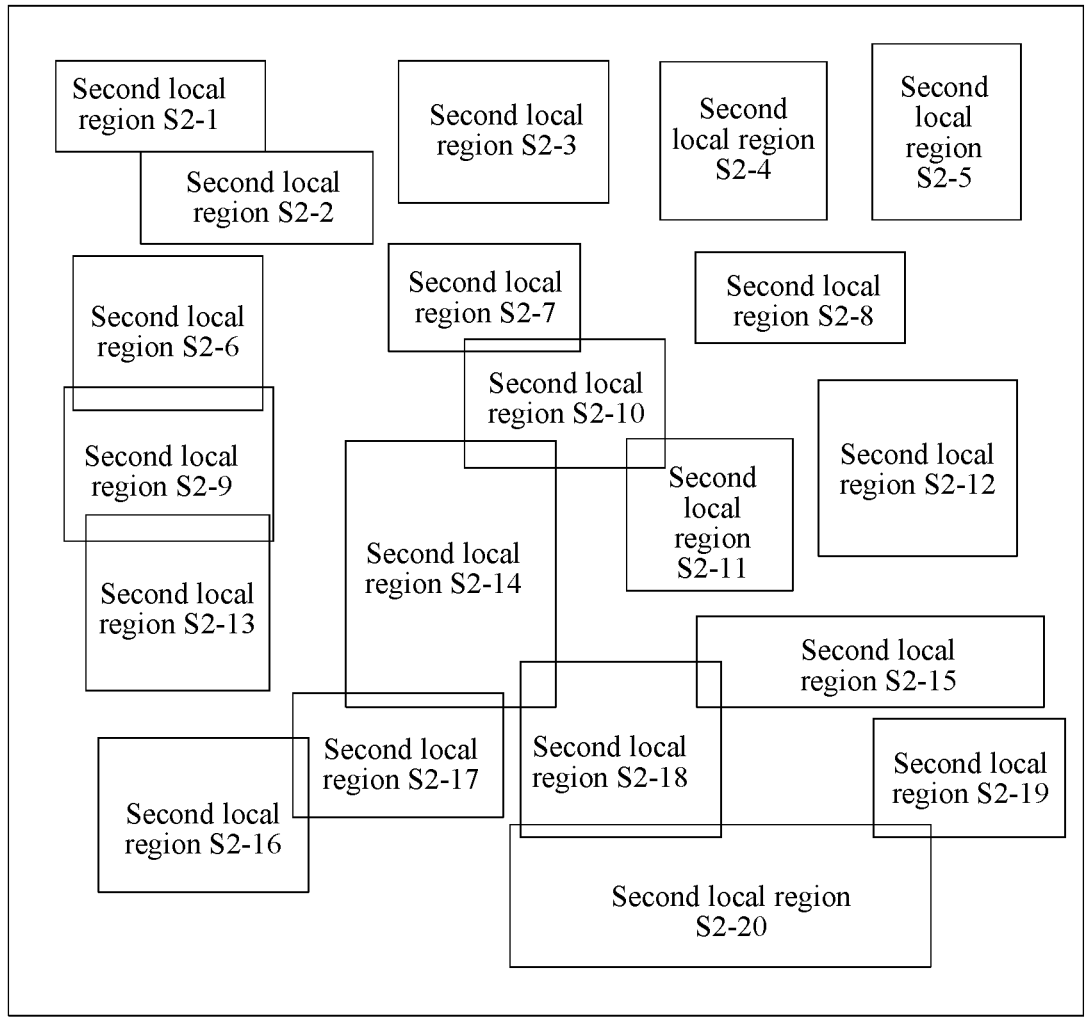
FIG. 3 is a diagram of m second local regions in a second picture according to an embodiment of the present application.

For example, as shown in FIG. 3, the server detects and identifies 20 second local regions, including a second local region S2-1 to a second local region S2-20, in the second picture according to the MSER algorithm.

In some embodiments, an approach or algorithm used by the server to identify the n first local regions and the m second local regions is not limited to the examples illustrated in this application. In this application, the MSER algorithm is used by the server to identify the n first local regions of the first picture and the m second local regions of the second picture as a non-limiting example.

Step 103: Obtain first characteristic values respectively corresponding to the n first local regions and second characteristic values respectively corresponding to the m second local regions.

In some embodiments, the server calculates the first characteristic values respectively corresponding to the n first local regions according to a preset algorithm according to the n first local regions.

For example, a first characteristic value of an $i^{th}$ first local region is used for representing feature information of the $i^{th}$ first local region, i being a positive integer less than or equal to n.

For example, the preset algorithm is a perceptual hash algorithm (pHash algorithm). The server obtains a perceptual hash value of the $i^{th}$ first local region according to the pHash algorithm as the first characteristic value of the $i^{th}$ first local region.

In some embodiments, the server calculates the second characteristic values respectively corresponding to the m second local regions according to the preset algorithm according to the m second local regions.

For example, a second characteristic value of a $j^{th}$ second local region is used for representing feature information of the $j^{th}$ second local region, j being a positive integer less than or equal to m.

In some embodiments, the second characteristic values respectively corresponding to the m second local regions are calculated by the server according to the preset algorithm in a manner similar to that for calculating the second characteristic values described above.

In some examples, the server obtains first characteristic values, that is, a first characteristic value Z1-1 to a first characteristic value Z1-12, respectively corresponding to 12 first local regions, and the server obtains second characteristic values, that is, a second characteristic value Z2-1 to a second characteristic value Z2-20 respectively corresponding to 20 second local regions.

Step 104: Determine, according to a comparison result of the n first characteristic values and the m second characteristic values, whether the first picture is similar to the second picture.

In some embodiments, the server compares each of the first characteristic values and each of the second characteristic values, to obtain a comparison result. The comparison result can be used to determine k hit regions that match k second local regions according to k corresponding first characteristic values and k corresponding second characteristic values. The server determines, according to the comparison result, whether the first picture is similar to the second picture.

In some embodiments, when a particular first local region and a particular second local region match, region sizes of the first local region and the matching second local region can be equal or not equal.

For example, assuming the first local region S1-4 (FIG. 2) in the first picture matches the second local region S2-5 (FIG. 3) in the second picture, a region size of the first local region S1-4 is "32*32", and a region size of the second local region S2-5 is "32*64".

In some embodiments, when the first local region matches the second local region, the relative position of the first local region in the first picture and the relative position of the matching second local region in the second picture can be the same or different.

For example, assuming the first local region S1-4 in the first picture matches the second local region S2-5 in the second picture, the first local region S1-4 is located near an upper left corner of the first picture, and the second local region S2-5 is located right near the upper-right corner of the second picture.

Figure 4:
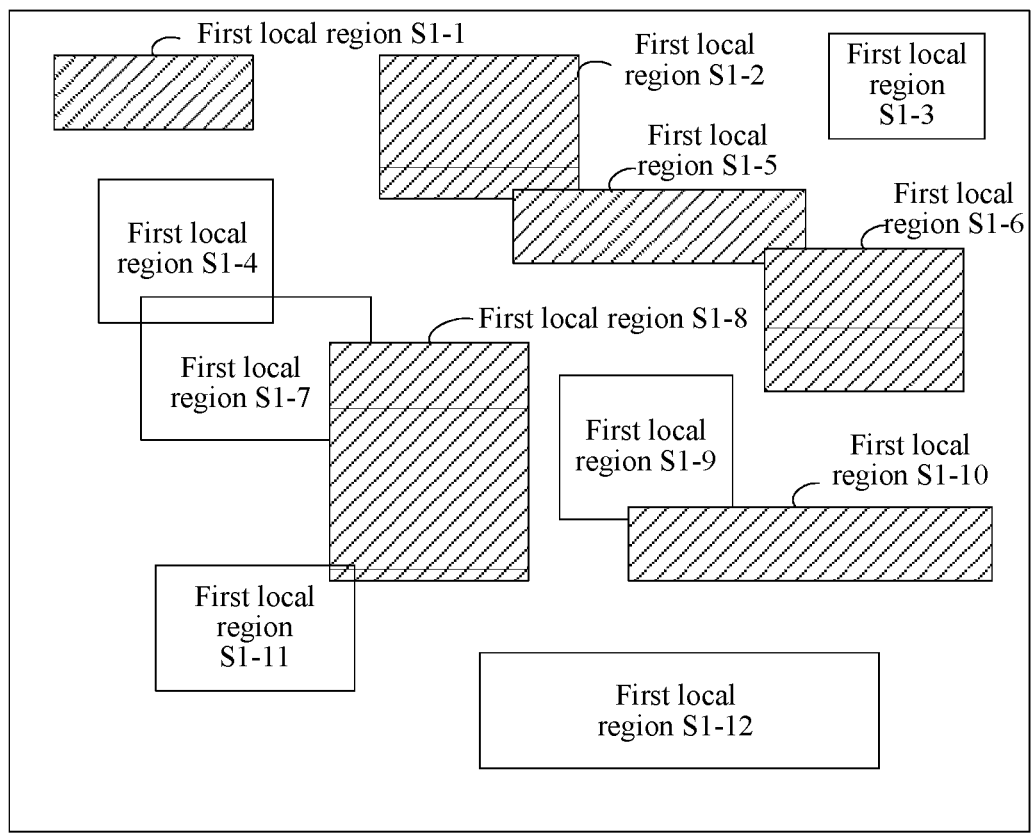
FIG. 4 is a diagram of k hit regions in a first picture according to an embodiment of the present application.

For example, based on 12 first local regions of the first picture provided in FIG. 2 and 20 second local regions of the second picture provided in FIG. 3, as shaded regions shown in FIG. 4, the server determines that 6 first characteristic values match 6 second characteristic values, respectively. According to the matched characteristic values, 6 first local regions match second local regions, respectively. The server can determine determines, according to the 6 first local regions (e.g., a first local region S1-1, a first local region S1-2, a first local region S1-5, a first local region S1-6, a first local region S1-8, and a first local region S1-10), whether the first picture is similar to the second picture.

In some embodiments, when the similar picture identification method is applied to copyright authentication services of pictures, the second picture is a copyright picture stored in the server, and the copyright picture is a picture having a copyright. The first picture may be a cropped version of the copyright picture, may be a scaled version of the copyright picture, or may be a cropped and scaled version of the copyright picture.

For example, the first picture is a picture obtained by cropping a left side of the second picture by one fourth. For another example, the first picture is a picture obtained by cropping the periphery of the second picture. For another example, the first picture is a picture obtained by cropping an upper left corner and an upper right corner of the second picture.

In one example, a user submits a first picture A to the server through a user terminal, the server identifies several first local regions from the first picture A and calculates a first characteristic value of each first local region, and the server feeds back, to the user terminal according to a comparison result of each first characteristic value and all second characteristic values in a picture database, a second picture B whose similarity with the first picture A is the highest. The server can further output copyright information of the second picture B, the copyright information including a copyright type and a copyright purchase address associated with the second picture B.

In conclusion, there are local regions in a processed picture that have an affine-invariant property (i.e., corresponding to a set of local regions that is affine invariant) regardless of which processing is performed on the picture. In the embodiments of this application, n first local regions of a first picture that have an affine-invariant property and m second local regions of a second picture that have an affine-invariant property can be identified, n first characteristic values respectively corresponding to the n first local regions and m second characteristic values respectively corresponding to the m second local regions are determined, each of the n first characteristic values and each of the m second characteristic values are compared, and whether the first picture is similar to the second picture is identified according to a comparison result. Accordingly, by extracting several local regions that have an affine-invariant property in the pictures, comparison of the two pictures is converted into comparison of characteristic values of two groups of local regions, so that the similar picture identification method has good crop resistance. In this way, a dimension of detection space is increased, and similar picture identification accuracy is also improved.

Figure 5:
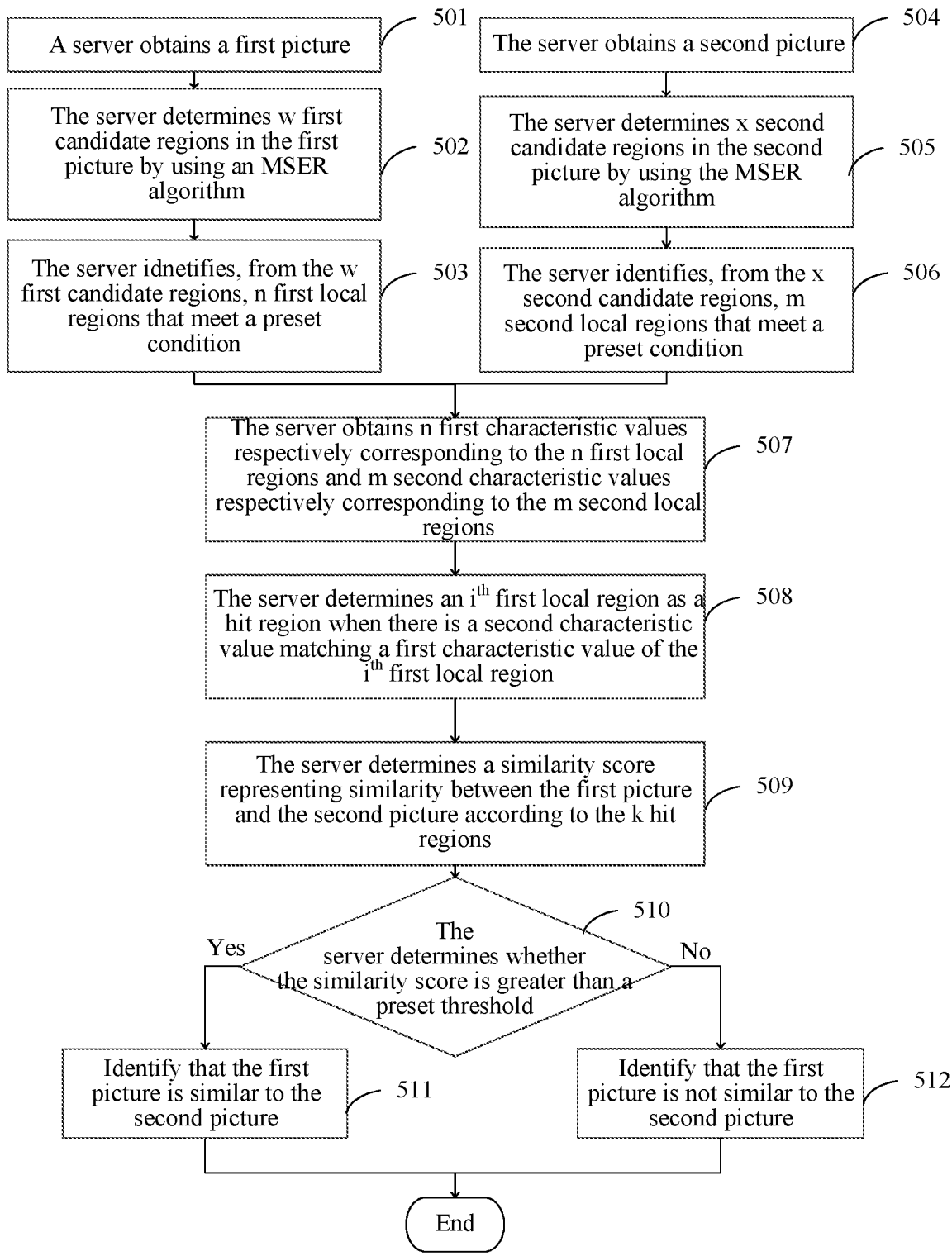
FIG. 5 is a flowchart of a similar picture identification method according to another embodiment of the present application.

Referring to FIG. 5, FIG. 5 is a flowchart of a similar picture identification method according to another embodiment of the present application. The method may include the following steps:

Step 501: A server obtains a first picture.

In some embodiments, after obtaining the to-be-detected first picture sent by the terminal, the server preprocesses the first picture. The preprocessing includes but is not limited to the following two possible approaches.

In a first possible processing approach, to exclude impact of colors on related calculation in a subsequent similar picture identification process, the server performs binarization on the obtained first picture, such as setting grayscale values of pixels of the first picture to 0 or 255.

In a second possible processing approach, a size of a picture is also a factor that affects subsequent related calculation. When a picture size of the first picture is less than a preset resolution threshold, the server cannot obtain the first local region from the first picture. Therefore, before obtaining the first local region, the server determines whether the picture size of the first picture meets a resolution requirement. If the picture size of the first picture is less than the preset resolution threshold, in some embodiments to convert the first picture to meet the resolution requirement, the server can stretch the shortest side of the first picture to a corresponding preset side length threshold and can stretch another side of the first picture by maintaining an original aspect ratio.

For example, the region size of the first picture obtained by the server is "200*400". When the server determines that the region size "200*400" of the first picture is less than a preset resolution threshold "400*400", the server stretches a side of the first picture corresponding to "200" to a preset side length threshold "400," and stretches another side corresponding to "400" to "800" to maintain an original aspect ratio. The stretched first picture thus meets the resolution requirement. In this case, the region size of the stretched first picture for further processing is "400*800".

It should be noted that one of the aforementioned two possible processing approaches may be selected for implementation, or the aforementioned two possible processing approaches may be combined in one implementation. Which one or both of the aforementioned approaches is implemented is not limited to the embodiments described in this application.

Step 502: The server determines w first candidate regions in the first picture (or processed first picture) according to an MSER algorithm.

w is a positive integer.

Step 503: The server identifies, from the w first candidate regions, n first local regions that meet a preset condition.

The preset condition is set by the server by default or set by the user. The preset condition includes that region sizes of the first local regions are between a first preset threshold and a second preset threshold, and the first preset threshold is less than the second preset threshold.

The first preset threshold can be a set smallest region size. When a region size of a first candidate region is less than the first preset threshold, the region may be excessively small for further processing, and the regions may be determined as an invalid region. Here, a candidate region is invalid refers to that there is a high probability for a false match with local regions in the second picture during comparison.

For example, provided a first candidate that is a pure white region and has a size of "5*5", which is less than a first preset threshold "32*32", there is a great probability for the server to find a pure white region whose region size is "5*5"

in the second picture in a subsequent matching process. Such match may not effectively represent the similarity between the first picture and the second picture and thus affects the accuracy of a final identification result.

The second preset threshold can be a set largest region size. When a region size of a first candidate region is greater than the second preset threshold, the region may be excessively large for further processing, or first candidate region may even correspond to the whole first picture. Therefore, the calculated first characteristic value may only represent the whole first picture and may not represent various local features of the first picture. A problem in a picture identification method that is based on considering the entire picture as a whole as discussed above remains.

If the server detects many first local regions whose region sizes are less than the first preset threshold in the first picture, a quantity of invalid regions is increased, thus a calculation amount of the server is increased, and a final identification result is inaccurate. Therefore, in a possible implementation, the server identifies, from the w first candidate regions, n first local regions whose region sizes are between the first preset threshold and the second preset threshold.

Figure 6:
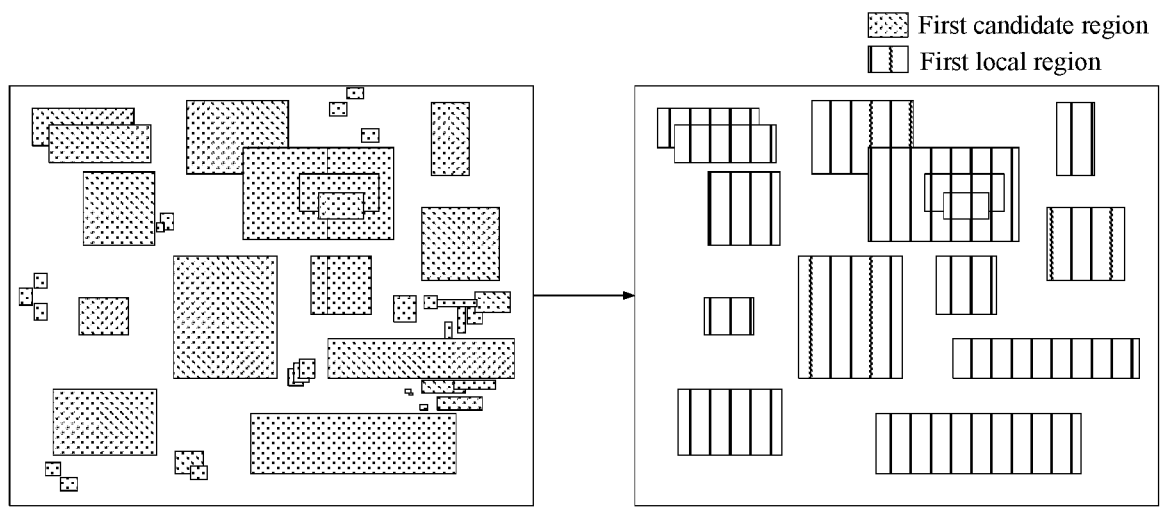
FIG. 6 is a diagram illustrating selection of n first local regions in a first picture from w first candidate regions in a similar picture identification method according to another embodiment of the present application.

For example, the first preset threshold is "32*32", and the second preset threshold is "200*200". As shown in FIG. 6, the server identifies, from the w first candidate regions, n first local regions whose region sizes are between "32*32" and "200*200". In some embodiments, values of the first preset threshold and the second preset threshold are not limited to those described in this embodiment.

In some embodiments, at least two first local regions of the n first local region can overlap or, one fully contains the other. In such embodiments, the server can refine the selection of the n first local regions that meet a preset condition.

In some embodiments, if two first local regions have an overlapping region, the server can retain the selection of the two first local regions.

In some embodiments among two first local regions, one first local region is fully contained by the other first local region, the server can cancel the selection of the contained first local region of the two first local regions and can retain the selection of the other first local region.

Figure 7:
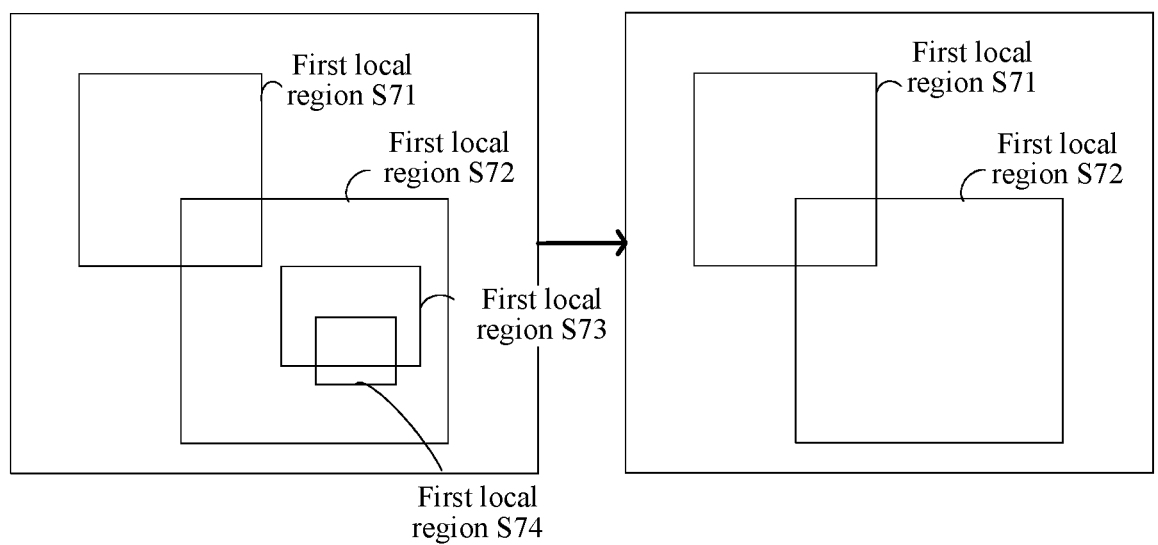
FIG. 7 is a diagram illustrating reduction of candidate local regions to n first local regions in a first picture in a similar picture identification method according to another embodiment of the present application.

For example, as shown in FIG. 7, the first local region S71 and the first local region S72 in the first picture have an overlapping region. The first local region S72 fully contains the first local region S73 and the first local region S74. The first local region S73 and the first local region S74 have an overlapping region. Therefore, the server can cancel the selection of the contained first local region S73 and first local region S74 and can retain the selection of the first local region S71 and the first local region S72.

To improve a similarity hit rate of local regions and improve accuracy of an identification result, in some embodiments, when identifying, from the w first candidate regions, the n first local regions, the server retains all the determined n first local regions that meet a preset condition. Accordingly, the aforementioned step of refining the selection of the n first local regions is not performed. In the following, only an example in which the selection of the n first local regions is not further refined is used for description in this embodiment.

When the server obtains, from the w first candidate regions, the n first local regions that meet a preset condition, an oval region and other non-rectangular regions are usually used to approximately accurately represent the first local regions. However, to reduce rotation transformation of an oval region and other non-rectangular regions and more conveniently identify the first local regions, rectangular regions are used to represent the first local regions in this embodiment of this application.

In some embodiments, each of the n first local regions can be a rectangular region or at least two first local regions can be rectangular regions.

Step 504: The server obtains a second picture.

In some embodiments, the server preprocesses the obtained second picture. The preprocessing includes binarization and/or stretching. For related details, refer to a preprocessing process of the server for the first picture in step 501.

Step 505: The server determines x second candidate regions in the second picture (or processed first picture) according to the MSER algorithm.

x is a positive integer.

Step 506: The server identifies, from the x second candidate regions, m second local regions that meet a preset condition.

The preset condition includes that region sizes of the second local regions are between a first preset threshold and a second preset threshold, and the first preset threshold is less than the second preset threshold.

In some embodiments, each of the m second local regions is a rectangular region or at least two second local regions are rectangular regions.

It should be noted that for a process in which the server detects the x second candidate regions in the second picture and identifies, from the x second candidate regions, the m second local regions that meet a preset condition, refer to detection and determining processes of the server for the first picture in step 502 and step 503. Details are not described herein again.

It also should be noted that, in some embodiments, steps 501 to step 503 and steps 504 to 506 may be performed in parallel. In some embodiments, steps 504 to 506 may be performed before steps 501 to 503. The applicable sequences and orders of various steps are not limited in this embodiment.

Step 507: The server obtains n first characteristic values respectively corresponding to the n first local regions and m second characteristic values respectively corresponding to the m second local regions.

Because the pHash algorithm has very good scale resistance, in some embodiments, the server calculates first perceptual hash values respectively corresponding to the n first local regions according to the pHash algorithm, and calculates second perceptual hash values respectively corresponding to the m second local regions according to the pHash algorithm. The type or representation of the characteristic values and method of calculating or obtaining characteristic values are not limited in this embodiment. In the following, only an example in which the first characteristic values are the first perceptual hash values, and the second characteristic values are the second perceptual hash values are used for description.

In some embodiments, there are many possible calculation methods for calculating a perceptual hash value of a picture. Only one possible calculation method is described below as a non-limiting example.

In an example where the server calculates the first perceptual hash values respectively corresponding to the n first local regions according to the pHash algorithm, a process of calculating the first perceptual hash values can include, but is not limited to, the following steps.

(1) The server performs smoothing on the n first local regions of the first picture.

(2) The server narrows and converts the n first local regions into 32*32 grayscale pictures.

(3) The server performs discrete cosine transform (DCT) on the obtained n grayscale pictures, to obtain n sets of DCT coefficient values of the n first local regions, where the DCT is a floating point operation.

(4) After removing the periphery of each set of DCT coefficient values, the server obtains 8*8 regions at an upper left corner that respectively correspond to the n first local regions.

In Step (4), after the server obtains the n sets of DCT coefficient values of the n first local regions, the periphery of each set of DCT coefficient values presents detail information of a first local region corresponding to the set of the DCT coefficient values. However, the detail information is not concerned in a similar picture identification process. Therefore, the periphery of the n sets of DCT coefficient values can be removed, so that the similar picture identification method provided in this embodiment of this application is more practical. However, because most of information about the first local regions is still gathered in an upper-left region of the sets of DCT coefficient values obtained after the periphery removal, 8*8 regions at the upper left corner of the sets of DCT coefficient values obtained after the periphery removal may be used to represent information about the first local regions.

(5) The server performs calculation according to preset algorithms according to 8*8 regions at the upper left corner that respectively correspond to the n first local regions, to obtain the first perceptual hash values respectively corresponding to the n first local regions.

Further, the foregoing preset algorithms can be one or more of many possible algorithms. That is, there may be more than one method for calculating the first perceptual hash values according to the 8*8 regions at the upper left corner.

Each 8*8 region at an upper left corner of each first local region includes 64 data points, and each data point corresponds to a value. As such, an 8*8 region at the upper left corner correspond to 64 values. In some embodiments, the server calculates a mean of 64 values corresponding to an 8*8 region at the upper left corner and compares each value of the 64 values with the mean. If a value is greater than the mean, the value corresponding to a data point is can be set to 1. If a value is less than or equal to the mean, the value corresponding to a data point is can be set to 0. The set values are sorted according to a predetermined sequence, to obtain 64 values, that is, the first perceptual hash values.

Figures 8, 9:
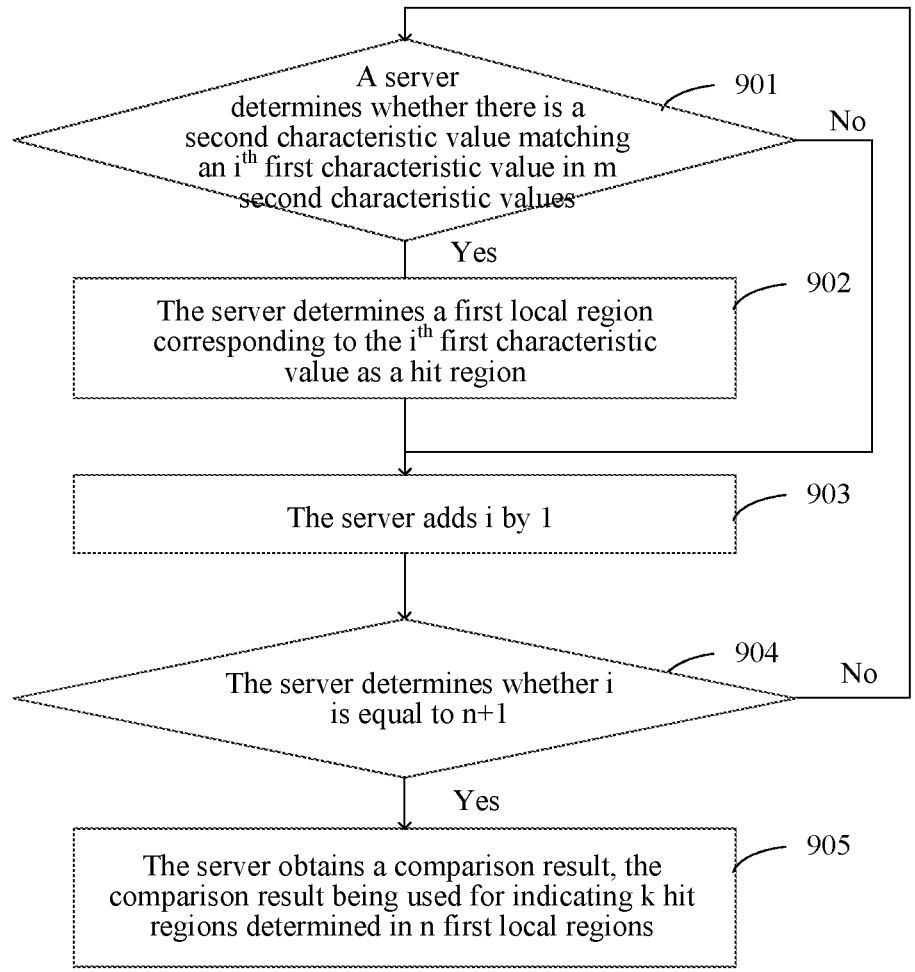
FIG. 8 is a diagram illustrating determination of a value corresponding to each region according to a mean value in a similar picture identification method according to an embodiment of the present application.
FIG. 9 is a flowchart of a method of determining hit regions according to another embodiment of the present application.

For example, as shown in FIG. 8, using a 3*3 region as an example, the foregoing process of obtaining a value corresponding to each data point according to a mean method is described. As shown in FIG. (a) in FIG. 8, the 3*3 region include 9 data points, which are respectively a data point 00, a data point 01, a data point 02, a data point 10, a data point 11, a data point 12, a data point 20, a data point 21, and a data point 22. A value corresponding to the data point 00 is 1, a value corresponding to the data point 01 is 2, a value corresponding to the data point 02 is 3, a value corresponding to the data point 10 is 4, a value corresponding to the data point 11 is 5, a value corresponding to the data point 12 is 6, a value corresponding to the data point 20 is 7, a value corresponding to the data point 21 is 8, and a value corresponding to the data point 22 is 9. The server obtains through calculation that a mean of the 9 values is 5 and separately compares the 9 values with the mean "5". The values corresponding to the data point 00, the data point 01, the data point 02, the data point 10, and the data point 11 are all less than or equal to the mean "5". The values corresponding to the 5 data points are all set to "0". The values corresponding to the data point 12, the data point 20, the data point 21, and the data point 22 are all greater than the mean "5". The values corresponding to 4 data points are all set to "1". Therefore, the set 9 values are obtained, as shown in FIG. (b) in FIG. 8. The server sorts the set 9 values according to a predetermined sequence, to obtain "000001111".

In some embodiments, for a calculation process in which the server calculates the second perceptual hash values respectively corresponding to the m second local regions through the pHash algorithm, refer to the foregoing process of calculating the first perceptual hash values. Details are not described herein again.

Step 508: The server determines, for a first characteristic value of an $i^{th}$ first local region, the $i^{th}$ first local region as a hit region if there is a second characteristic value matching the first characteristic value.

In some embodiments, the first characteristic value of the $i^{th}$ first local region is compared with the m second characteristic values separately. If there is a second characteristic value matching the first characteristic value, the $i^{th}$ first local region corresponding to the first characteristic value is determined as the hit region. In some embodiments, matching relationship of the first characteristic values and the second characteristic values can be a one-to-one correspondence relationship.

Moreover, the server can determine k hit regions according to the n first characteristic values and the m second characteristic values according to, but is not limited to, the following steps, with reference to FIG. 9.

Step 901: The server determines whether there is a second characteristic value matching an $i^{th}$ first characteristic value in the m second characteristic values, an initial value of i being 1.

In some embodiments, for an $i^{th}$ first perceptual hash value, Hamming distances between the $i^{th}$ first perceptual hash value and the m second perceptual hash values are separately calculated. If a Hamming distance is less than a preset distance threshold, the server determines that there is a second characteristic value matching the $i^{th}$ first characteristic value.

The preset distance threshold can be set by the server by default or set by the user. For example, the preset distance threshold is 5.

For example, for a particular first perceptual hash value is H111, the server sequentially calculates Hamming distances between the particular perceptual hash value H111 and 20 second perceptual hash values. When a Hamming distance between a particular second perceptual hash value H211 and the particular first perceptual hash value H111 that is obtained through calculation by the server is 3, it is determined that the Hamming distance "3" is less than the preset distance threshold "5". Therefore, the server determines that there is at least one second perceptual hash value (e.g., the second perceptual hash value H211) matching the particular first perceptual hash value H111.

In some embodiments, if the server determines that there is a second characteristic value matching the $i^{th}$ first characteristic value in the m second characteristic values, perform step 902. If the server determines that there is no second characteristic value matching the $i^{th}$ first characteristic value in the m second characteristic values, perform step 903.

Step 902: The server determines a first local region corresponding to the $i^{th}$ first characteristic value as the hit region if there is a second characteristic value matching the $i^{th}$ first characteristic value in the m second characteristic values.

In some embodiments, when the server determines a Hamming distance corresponding to a second perceptual hash value is less than the preset distance threshold, the server can determine a second local region corresponding to the second perceptual hash value as the hit region.

For example, when determining that there is the second perceptual hash value H211 matching the first perceptual hash value H111, the server determines a first local region corresponding to the first perceptual hash value H111 as the hit region.

In some embodiments, after the server determines whether the first local region corresponding to the $i^{th}$ first characteristic value is the hit region, the process proceeds to Step 904.

Step 903: The server adds i by 1.

Step 904: The server determines whether i exceeds the number n of the identified first local regions (e.g., determining whether i is equal to n+1 in this example).

In some embodiments, when i is equal to n+1, perform step 905. When i is not equal to n+1, continue to perform step 901.

Step 905: The server obtains a comparison result after I exceeds the number n, and the comparison result can be used for indicating the k hit regions from the n first local regions.

In some embodiments, k is an integer equal to or greater than 0.

For example, based on the 12 first local regions of the first picture provided in FIG. 2 and 20 second local regions of the second picture provided in FIG. 3, the server compares each of the first characteristic values and each of the second characteristic values, to obtain a comparison result. The comparison result is shown in Table 1. The comparison result is that a second characteristic value Z2-1 matches a first characteristic value Z1-1, a second characteristic value Z2-3 matches a first characteristic value Z1-2, a second characteristic value Z2-8 matches a first characteristic value Z1-5, a second characteristic value Z2-12 matches a first characteristic value Z1-6, a second characteristic value Z2-14 matches a first characteristic value Z1-8, a second characteristic value Z2-15 matches a first characteristic value Z1-10, and for other 6 first characteristic values, the server does not find second characteristic values respectively corresponding to the 6 first characteristic values.

TABLE 1

| First characteristic value | Matched Second characteristic value |
|---|---|
| First characteristic value Z1-1 | Second characteristic value Z2-1 |
| First characteristic value Z1-2 | Second characteristic value Z2-3 |
| First characteristic value Z1-3 | None |
| First characteristic value Z1-4 | None |
| First characteristic value Z1-5 | Second characteristic value Z2-8 |
| First characteristic value Z1-6 | Second characteristic value Z2-12 |
| First characteristic value Z1-7 | None |
| First characteristic value Z1-8 | Second characteristic value Z2-14 |

TABLE 1-continued

| First characteristic value | Matched Second characteristic value |
|---|---|
| First characteristic value Z1-9 | None |
| First characteristic value Z1-10 | Second characteristic value Z2-15 |
| First characteristic value Z1-11 | None |
| First characteristic value Z1-12 | None |

Based on the comparison result shown in Table 1, referring to FIG. 4 again, the server determines, out of the 12 first local regions of the first picture, 6 hit regions, including a first local region S1-1 corresponding to the first characteristic value Z1-1, a first local region S1-2 corresponding to the first characteristic value Z1-2, a first local region S1-5 corresponding to the first characteristic value Z1-5, a first local region S6 corresponding to the first characteristic value Z1-6, a first local region S1-8 corresponding to the first characteristic value Z1-8, and a first local region S1-10 corresponding to the first characteristic value Z1-10.

After the examples of identifying k hit regions, the following continues illustrating the method as depicted in FIG. 5.

Step 509: The server determines a similarly score representing similarity between the first picture and the second picture according to the k hit regions, k being an integer.

Methods used by the server to determine the similarly score representing the similarity between the first picture and the second picture according to the determined k hit regions include, but are not limited to, the following examples.

In a first exemplary determining method, the server determines a ratio of k to n as the similarity score.

For example, the server determines, according to the 6 hit regions determined in the first picture, that a ratio of k to n is "50%", and thus determines that the similarly score representing the similarity between the first picture and the second picture is "50%".

In a second exemplary determining method, the server determines a ratio of an area of the k hit regions to an area of the first picture as the similarly score representing the similarity between the first picture and the second picture.

For example, when the server determines the k hit regions of the first picture, an area S1 of the first picture and an area S2 of the k hit regions are calculated, and a ratio of S2 to S1 is determined as the similarly score representing the similarity between the first picture and the second picture.

For example, the server calculates, according to the 6 hit regions determined in the first picture, the ratio of the area of the 6 hit regions to the area of the first picture as "40%", and thus determines that the similarly score representing the similarity between the first picture and the second picture is "40%".

Step 510: The server determines whether the similarly score representing the similarity is greater than a preset similarity threshold.

The preset similarity threshold can be set by the server by default or set by the user. In some embodiments, the preset similarity threshold is expressed in a percentage format. For example, the preset similarity threshold can be set to "25%".

Step 511: The server determines that the first picture is similar to the second picture when the similarity score is greater than the preset similarity threshold.

For example, the preset similarity threshold is "25%". After determining that the similarly score representing the similarity between the first picture and the second picture is "50%", the server determines that the similarity score "50%" is greater than the preset similarly threshold "25%", and thus determines that the first picture is similar to the second picture.

Step 512: The server determines that the first picture is not similar to the second picture when the similarity score is less than or equal to the preset similarity threshold.

For example, the preset similarity threshold is "25%". After determining that the similarly score representing the similarity between the first picture and the second picture is "10%", the server determines that the similarity score "10%" is less than the preset similarity threshold "25%", and thus determines that the first picture is not similar to the second picture.

In conclusion, in this embodiment of this application, n first local regions of a first picture that have an affine-invariant property and m second local regions of a second picture that have an affine-invariant property are identified, first characteristic values respectively corresponding to the n first local regions and second characteristic values respectively corresponding to the m second local regions are determined, and each of the n first characteristic values and each of the m second characteristic values are compared. Whether the first picture is similar to the second picture is determined according to a comparison result, which corresponds to comparison of characteristic values of two groups of local regions. According to this example, the similar picture identification method has good crop resistance. In this way, a dimension of detection space is increased, and similar picture identification accuracy is also improved.

In some embodiments, the n first local regions meeting a preset condition are identified from the first picture according to the MSER algorithm, and the m second local regions meeting a preset condition are identified from the second picture according to the MSER algorithm. Because the MSER algorithm has very good crop resistance, even if the first picture is a cropped picture, the server still can accurately identify whether the first picture is similar to the second picture.

In some embodiments, the first perceptual hash values respectively corresponding to the n first local regions are calculated according to the pHash algorithm, the second perceptual hash values respectively corresponding to the m second local regions are calculated according to the pHash algorithm, Hamming distances of the first perceptual hash values and the second perceptual hash values are compared, and whether the first local regions match the second local regions is determined. Because the pHash algorithm has very good scale resistance, even if the first picture is a scaled picture, the server still can accurately identify whether the first picture is similar to the second picture.

It should be noted that the similar picture identification method can be applied to various scenarios including, but not limited to, the following exemplary scenarios.

In a first exemplary scenario, the server obtains two pictures, that is, the first picture and the second picture, and determines, through the similar picture identification method, whether the two pictures are similar, as similarly described with reference to the embodiments shown in FIG. 1 to FIG. 9.

Based on the first exemplary scenario, in a second exemplary scenario, the server pre-stores p second pictures in a picture database. The server receives a to-be-detected first picture sent by the terminal. One or more second pictures (e.g., t pictures) that have similarity scores with respect the first picture higher than a preset similarity threshold is searched from the p second pictures stored in the picture database. If there is such a second picture, a query result is fed back to the terminal. The query result includes picture identifiers respectively corresponding to at least the t second pictures, p and t being both positive integers. In the following, the similar picture identification method in the second exemplary scenario is described with reference to FIG. 10 to FIG. 11.

Figure 10:
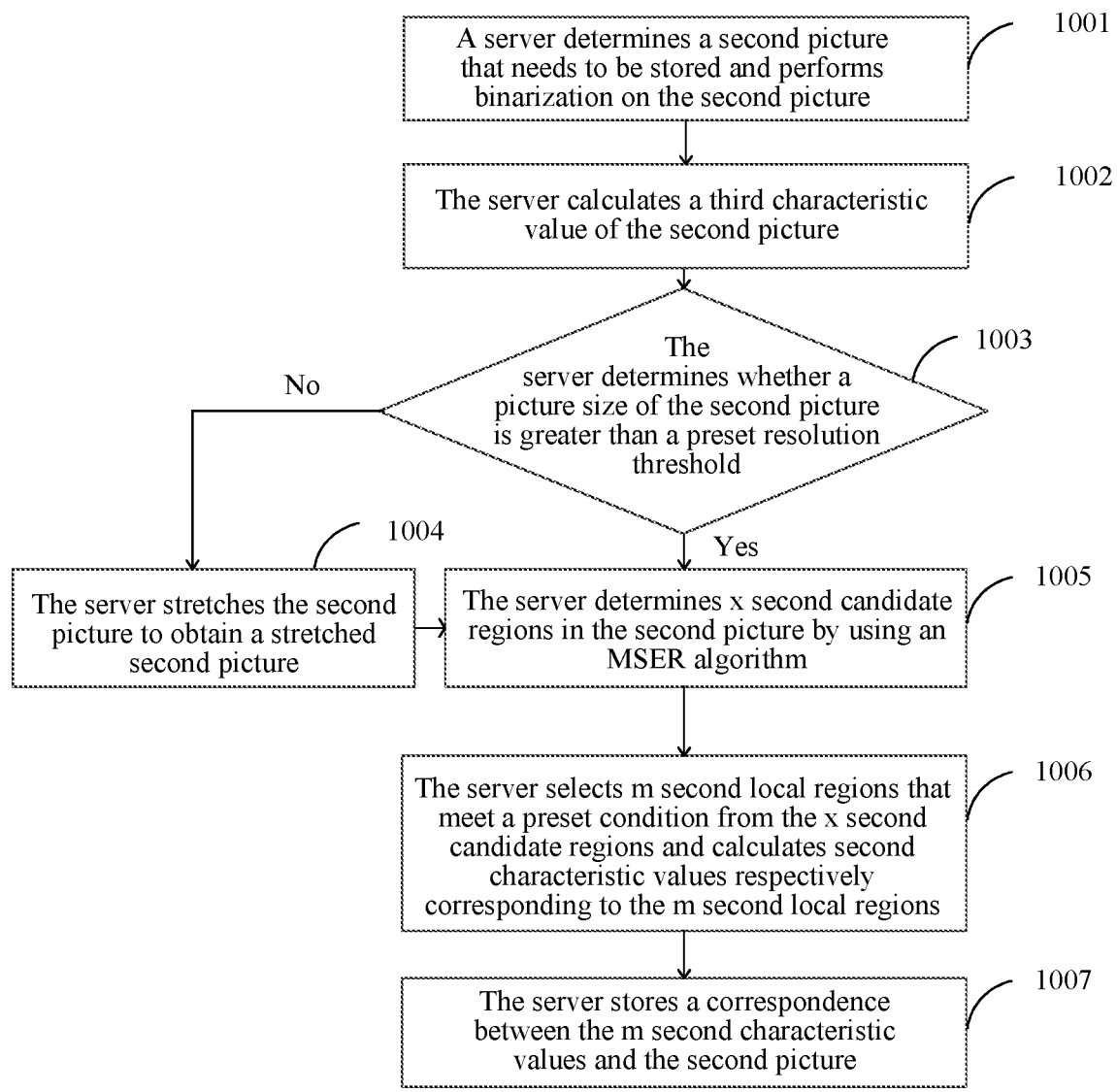
FIG. 10 is a flowchart of a method of processing second pictures according to another embodiment of the present application.

In the foregoing second exemplary scenario, in some embodiments, before a second picture is stored, the server can process the second picture. A processing process includes but is not limited to the following several steps, as shown in FIG. 10.

Step 1001: The server determines a second picture that needs to be stored and performs binarization on the second picture.

In some embodiments, the server performs binarization on the second picture and sets grayscale values of pixels in the second picture to 0 or 255.

Step 1002: The server calculates a third characteristic value of the second picture.

In some embodiments, the third characteristic value is a third perceptual hash value of the second picture, and the third perceptual hash value is used for representing feature information of the whole second picture.

In some embodiments, after calculating the third characteristic value of the second picture, the server stores a correspondence between the third characteristic value and the second picture. For example, the correspondence is stored in a form of (third characteristic value, picture identifier).

For example, after the server performs binarization on the second picture T001, the server calculates the third perceptual hash value of the second picture T001 as H311. Therefore, the server performs storage in a form of (H311,T001).

Step 1003: The server determines whether a picture size of the second picture is greater than a preset resolution threshold.

In some embodiments, if the picture size is less than the preset resolution threshold, perform step 1004; if the picture size is greater than or equal to the preset resolution threshold, perform step 1005. In some examples, the preset resolution threshold is 400*400.

Step 1004: The server stretches the second picture while maintaining its aspect ratio, to obtain a stretched second picture.

Step 1005: The server determines x second candidate regions in the second picture (or the stretched second picture) according to an MSER algorithm.

Step 1006: The server selects m second local regions that meet a preset condition from the x second candidate regions and calculates second characteristic values respectively corresponding to the m second local regions.

Step 1007: The server stores a correspondence between the m second characteristic values and the second picture.

In some embodiments, the server stores a correspondence between a picture identifier of the second picture and the m second characteristic values.

In one embodiment, the correspondence is shown in Table 2. The second picture T001 includes 5 second local regions. Each second local region correspond to a second characteristic value. That is, the second picture T001 correspond to 5 second characteristic values, respectively, a second characteristic values $Z1$, a second characteristic values $Z2$, a second characteristic values Z3, a second characteristic values Z4, and a second characteristic values Z5.

TABLE 2

| Second picture | Second characteristic values |
|---|---|
| T001 | Second characteristic value Z1 |
| | Second characteristic value Z2 |
| | Second characteristic value Z3 |
| | Second characteristic value Z4 |
| | Second characteristic value Z5 |

It should be noted that not all related details are described with reference to FIG. 10. Some of the details of the disclosed embodiments are the same or similar to the examples as described in the method embodiments shown in FIG. 1 to FIG. 9.

Figure 11:
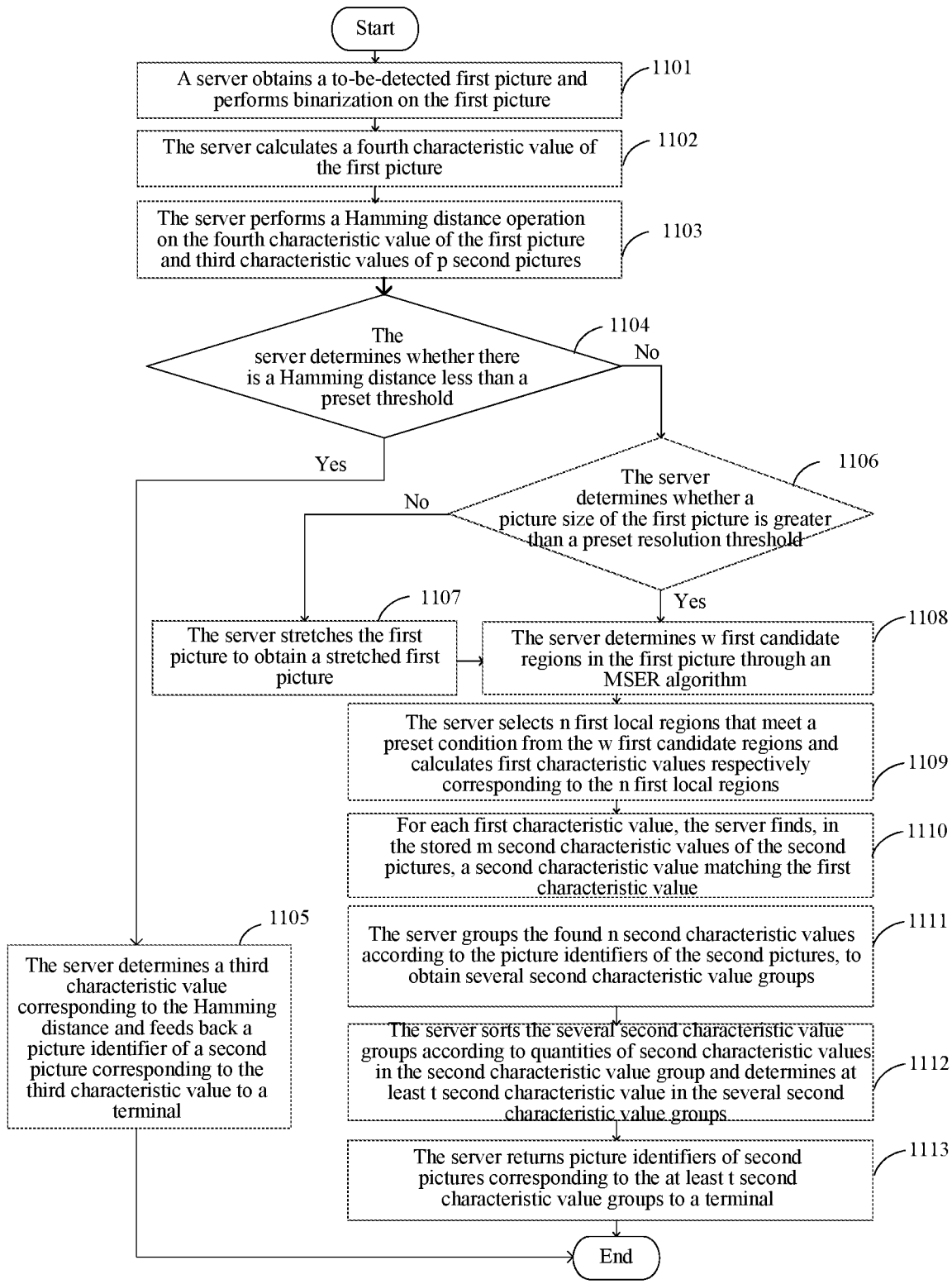
FIG. 11 is a flowchart of a similar picture identification method according to another embodiment of the present application.

In the foregoing second exemplary scenario, in some embodiments, the process in which the server performs query in the picture database according to the first picture, to obtain the query result includes, but is not limited to, the following several steps, as shown in FIG. 11.

Step 1101: The server obtains a to-be-detected first picture and performs binarization on the first picture.

In some embodiments, the server receives the first picture sent by the terminal, performs binarization on the first picture, and sets grayscale values of pixels in the first picture to 0 or 255.

Step 1102: The server calculates a fourth characteristic value of the first picture.

In some embodiments, the fourth characteristic value is a fourth perceptual hash value of the first picture, the fourth perceptual hash value is used for representing feature information of the whole first picture.

Step 1103: The server performs a Hamming distance operation on the fourth characteristic value of the first picture and third characteristic values of p second pictures.

Step 1104: The server determines whether there is a Hamming distance less than a preset distance threshold.

In some embodiments, the preset distance threshold is 5.

Step 1105: If there is a Hamming distance less than the fourth preset threshold, the server determines a third characteristic value corresponding to the Hamming distance and feeds back a picture identifier of a second picture corresponding to the third characteristic value to a terminal.

Step 1106: If there is no Hamming distance less than the preset distance threshold, the server determines whether a picture size of the first picture is greater than a preset resolution threshold.

In some embodiments, if the picture size is less than the preset resolution threshold, perform step 1107; if the picture size is greater than or equal to the preset resolution threshold, perform step 1108. For example, the preset resolution threshold can be 400*400.

Step 1107: The server stretches the first picture while maintaining its aspect ratio to obtain a stretched first picture.

Step 1108: The server determines w first candidate regions in the first picture (or the stretched first picture) according to an MSER algorithm.

Step 1109: The server selects n first local regions that meet a preset condition from the w first candidate regions and calculates first characteristic values respectively corresponding to the n first local regions.

Step 1110: For each first characteristic value, the server finds, in the stored m second characteristic values of the second pictures, whether there is a second characteristic value matching the first characteristic value.

In some embodiments, when a Hamming distances between a first characteristic value and a second characteristic value is less than the preset distance threshold, the server determines that the first characteristic value matches the second characteristic value.

In some embodiments, when the server determines that an $i^{th}$ first characteristic value matches a $j^{th}$ second characteristic value, the $i^{th}$ first characteristic value and the $j^{th}$ second characteristic value do not participate in a subsequent comparison process. In this way, repeated hitting of a local region can be avoided, and a hitting error can be reduced.

For example, after selecting 12 first local regions that meet a preset condition from the first picture, the server determines a second characteristic value matching each first characteristic value, as shown in Table 3. That the first characteristic value Z1-1 corresponds to (T001, Z1) indicates that the second characteristic value Z1 of the second picture T001 matches the first characteristic value Z1-1; that the first characteristic value Z1-2 corresponds to (T001, Z2) indicates that the second characteristic value Z2 of the second picture T001 matches the first characteristic value Z1-2; that the first characteristic value Z1-3 corresponds to (T077, Z25) indicates that the second characteristic value Z25 of the second picture T077 matches the first characteristic value Z1-3. The rest of the matched characteristic values as shown in Table. 3 can be self-explanatory.

TABLE 3

| First characteristic value | Second characteristic value of second picture |
|---|---|
| First characteristic value Z1-1 | (T001, Z1) |
| First characteristic value Z1-2 | (T001, Z2) |
| First characteristic value Z1-3 | (T077, Z25) |
| First characteristic value Z1-4 | (T057, Z38) |
| First characteristic value Z1-5 | (T123, Z8) |
| First characteristic value Z1-6 | (T001, Z12) |
| First characteristic value Z1-7 | (T077, Z4) |
| First characteristic value Z1-8 | (T001, Z14) |
| First characteristic value Z1-9 | (T023, Z67) |
| First characteristic value Z1-10 | (T001, Z15) |
| First characteristic value Z1-11 | (T057, Z49) |
| First characteristic value Z1-12 | (T077, Z50) |

Step 1111: The server groups the found n second characteristic values according to the picture identifiers of the second pictures, to obtain several second characteristic value groups, in which each a second characteristic value corresponds to a picture identifier of a corresponding second picture.

For example, the server groups the found 12 second characteristic values according to the picture identifiers of the second picture, to obtain 5 second characteristic value groups, as shown in Table 4. A second characteristic value group 1 corresponds to the second picture T001. The second characteristic value group 1 stores 5 matching second characteristic values, including second characteristic values Z1, Z2, Z8, Z12, and Z14. A second characteristic value group 2 corresponds to the second picture T077. The second characteristic value group 2 stores 3 matching second characteristic values, including second characteristic values Z4, Z25, and Z50. A second characteristic value group 3 corresponds to the second picture T057. The second characteristic value group 3 stores 2 matching second characteristic values, including second characteristic values Z38 and Z49. A second characteristic value group 4 corresponds to the second picture T023. The second characteristic value group 4 stores one matching second characteristic value, that is, a second characteristic value Z67. A second characteristic value group 5 corresponds to the second picture T123. The second characteristic value group 5 stores one matching second characteristic value, that is, a second characteristic value Z8.

TABLE 4

| Second characteristic value group | Picture identifier of second picture | Second characteristic value |
| --- | --- | --- |
| Second characteristic value group 1 | T001 | Z1, Z2, Z8, Z12, Z14 |
| Second characteristic value group 2 | T023 | Z67 |
| Second characteristic value group 3 | T057 | Z38, Z49 |
| Second characteristic value group 4 | T077 | Z4, Z25, Z50 |
| Second characteristic value group 5 | T123 | Z8 |

Step 1112: The server sorts the several second characteristic value groups according to quantities of second characteristic values in the second characteristic value group and determines at least t second characteristic values in the several second characteristic value groups.

In some embodiments, the server sorts the several second characteristic value groups according to a descending order of quantities of second characteristic values in the second characteristic value group and determines first 3 second characteristic value groups in the several second characteristic value groups.

For example, the server sorts 5 second characteristic value groups according to a descending order of quantities of second characteristic values in the second characteristic value group, the second characteristic value groups being sequentially a second characteristic value group 1, a second characteristic value group 4, a second characteristic value group 3, a second characteristic value group 2, and a second characteristic value group 5. That is, the first 3 second characteristic value groups are respectively the second characteristic value group 1, the second characteristic value group 4, and the second characteristic value group 3.

Step 1113: The server returns picture identifiers of second pictures corresponding to the at least t second characteristic values to the terminal.

For example, after identifying the second characteristic value group 1, the second characteristic value group 4, and the second characteristic value group 3, the server determines the second picture T001 corresponding to the second characteristic value group 1, the second picture T077 corresponding to the second characteristic value group 4, and the second picture T057 corresponding to the second characteristic value group 3, and returns picture identifiers of the 3 second pictures to the terminal, to indicate to the terminal that the second picture T001, the second picture T077, and the second picture T057 are pictures having high similarity with the first picture.

It should be noted that the related details not disclosed in the embodiment provided in FIG. 11, such as a preprocessing process of pictures and a process of calculating perceptual hash values, are the same or similar to those described above with reference to FIG. 1 to FIG. 9.

Apparatus embodiments of the present application are described below, and may be used for performing the method embodiments of the present application. For details not disclosed in the apparatus embodiments of the present application, refer to the method embodiments of the present application.

Figure 12:
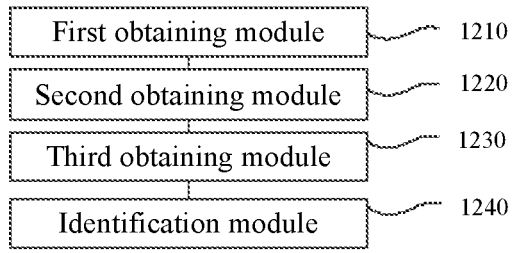
FIG. 12 is a block diagram of a similar picture identification apparatus according to an embodiment of the present application.

Referring to FIG. 12, FIG. 12 is a block diagram of a similar picture identification apparatus according to an embodiment of the present application. The similar picture identification apparatus may become all or a part of the terminal or the server and implemented by a dedicated hardware circuit or combination of software and hardware. The similar picture identification apparatus includes a first obtaining module 1210, a second obtaining module 1220, a third obtaining module 1230, and an identification module 1240.

The first obtaining module 1210 is configured to perform step 101.

The second obtaining module 1220 is configured to perform step 102.

The third obtaining module 1230 is configured to perform step 103.

The identification module 1240 is configured to perform step 104.

Figure 13:
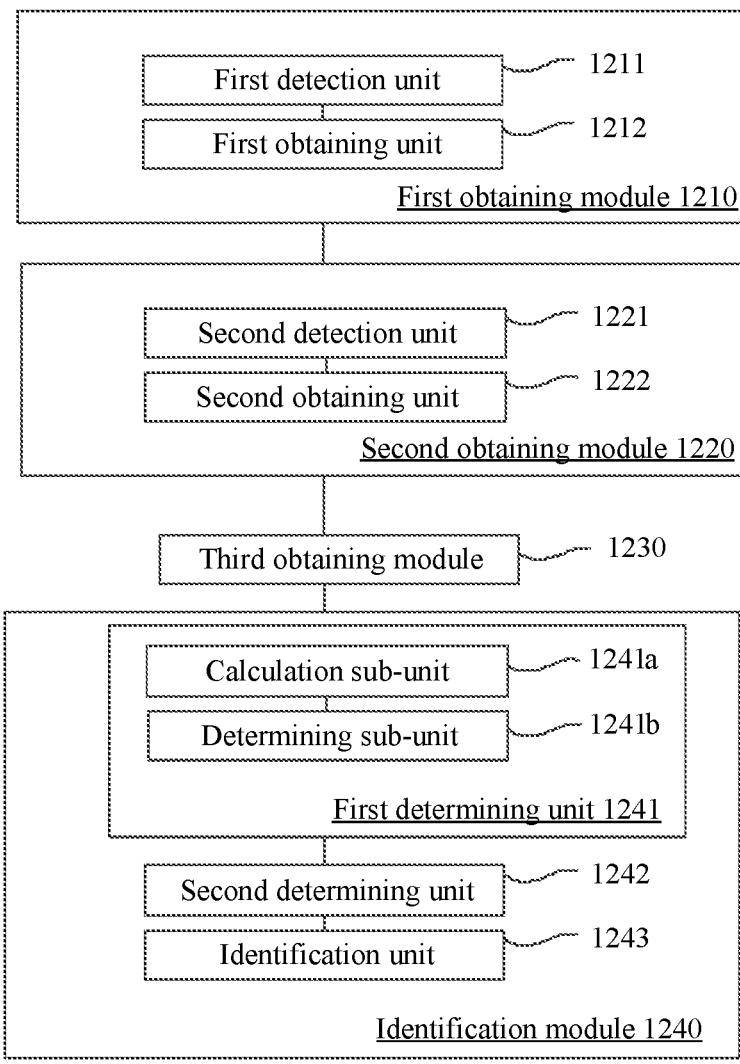
FIG. 13 is a block diagram of a similar picture identification apparatus according to another embodiment of the present application.

In at least one embodiment provided based on the embodiment shown in FIG. 12, as further shown in FIG. 13, the first obtaining module 1210 includes a first detection unit 1211 and a first obtaining unit 1212.

The first detection unit 1211 is configured to perform step 502 and/or 1108.

The first obtaining unit 1212 is configured to perform step 503.

In at least one embodiment provided based on the embodiment shown in FIG. 12, as further shown in FIG. 13, the second obtaining module 1220 includes a second detection unit 1221 and a second obtaining unit 1222.

The second detection unit 1221 is configured to perform step 505 and/or 1005.

The second obtaining unit 1222 is configured to perform step 506.

In at least one embodiment provided based on the embodiment shown in FIG. 12, as further shown in FIG. 13, the identification module 1240 includes a first determining unit 1241, a second determining unit 1242, and an identification unit 1243.

The first determining unit 1241 is configured to perform step 508.

The second determining unit 1242 is configured to perform step 509.

The identification unit 1243 is configured to perform step 511.

In at least one embodiment provided based on the embodiment shown in FIG. 12, as further shown in FIG. 13, the first characteristic values are first perceptual hash values, the second characteristic values are second perceptual hash values, and the first determining unit 1241 includes a calculation sub-unit 1241a and a determining sub-unit 1241b.

The calculation sub-unit 1241*a* is configured to separately calculate, for each first perceptual hash value, Hamming distances between a particular first perceptual hash value and the m second perceptual hash values.

The determining sub-unit 1241*b* is configured to determine a first local region corresponding to the particular first perceptual hash value as a hit region if there is a Hamming distance less than a preset distance threshold.

In some embodiments, the second determining unit 1242 is further configured to determine a ratio of a quantity of the k hit regions to a quantity of the n first local regions as a similarity score representing the similarity between the first picture and the second picture.

In some embodiments, the second determining unit 1242 is further configured to determine a ratio of an area of the k hit regions to an area of the first picture as the similarity score representing the similarity between the first picture and the second picture.

For related details, refer to method embodiments shown in FIG. 1 to FIG. 11. When at least one instruction corresponding to the first obtaining module 1210, the second obtaining module 1220, and the third obtaining module 1230 is loaded and executed by the processor, the first obtaining module 1210, the second obtaining module 1220, and the third obtaining module 1230 are further configured to implement any other function that is related to an obtaining step and that is implied or disclosed in the foregoing embodiments. When at least one instruction corresponding to the identification module 1240 is loaded and executed by the processor, the identification module 1240 is further configured to implement any other function that is related to an identification step and that is implied or disclosed in the foregoing embodiments.

The foregoing embodiments are described as non-limiting embodiments correspond to implementing the functions of the apparatus. In some practical applications, some or all of these functions may be allocated to or completed by different function modules according to requirements. That is, an internal structure of the device is divided into different function modules, to complete all or some of the functions described above. For the specific implementation process, refer to the method embodiments, and details are not described herein again.

This embodiment provides a computer device. The computer device includes a processor and a memory. The memory stores at least one instruction. The at least one instruction is loaded and executed by the processor to perform a method. In some embodiments, the method includes identifying n first local regions of a first picture, the n first local regions being a set of regions that is affine invariant; identifying m second local regions of a second picture, the m second local regions being a set of regions that is affine invariant; and obtaining n first characteristic values respectively corresponding to the n first local regions and m second characteristic values respectively corresponding to the m second local regions, the first characteristic values representing feature information of the first local regions, and the second characteristic values representing feature information of the second local regions. In some embodiments, the method further includes determining, according to a comparison result of the n first characteristic values and the m second characteristic values, whether the first picture is similar to the second picture, n and m being positive integers.

In some embodiments, the computer device includes a terminal and/or a server.

Figure 14:
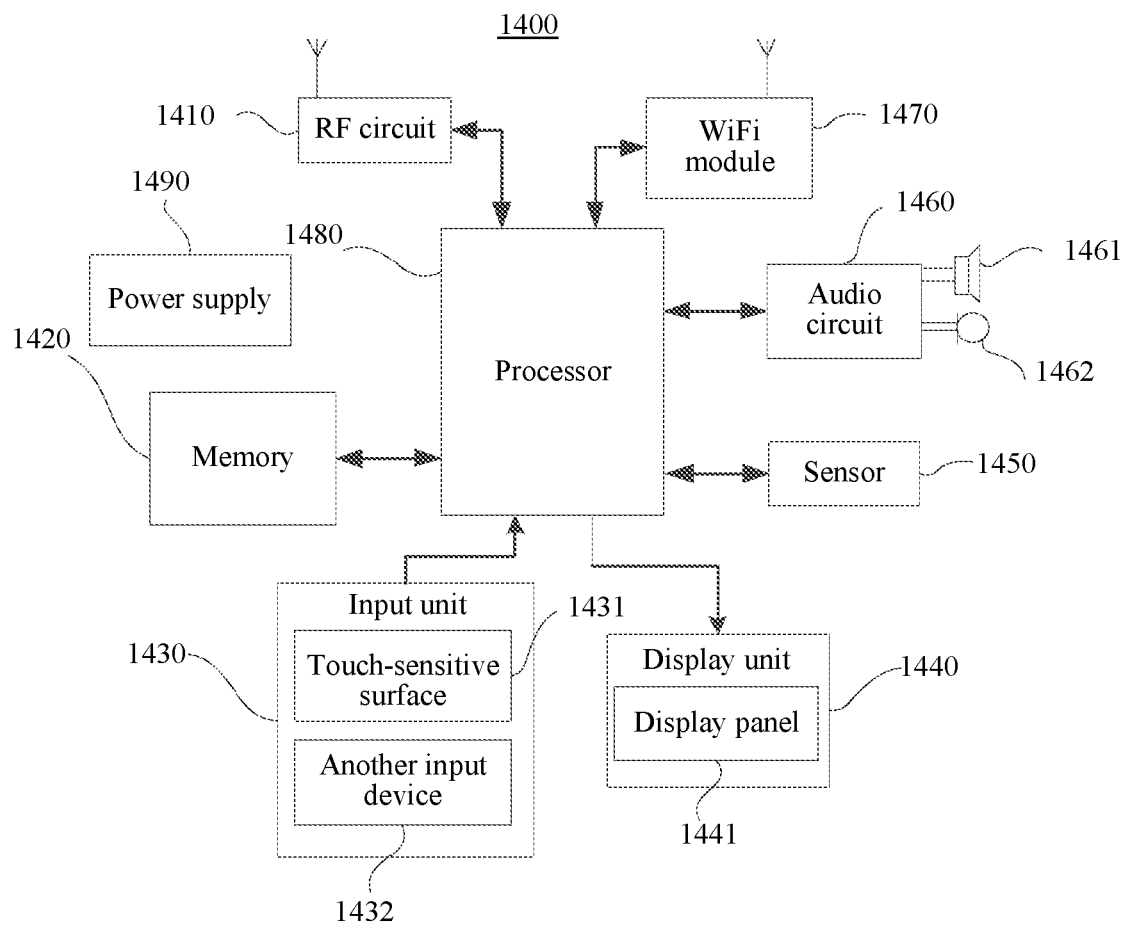
FIG. 14 is a block diagram of a terminal according to an embodiment of the present application.

FIG. 14 is a block diagram of a terminal 1400 according to an embodiment of the present application. The terminal 1400 may include components such as a radio frequency (RF) circuit 1410, a memory 1420 including one or more computer-readable storage media, an input unit 1430, a display unit 1440, a sensor 1450, an audio circuit 1460, a Wi-Fi module 1470, a processor 1480 including one or more processing cores, and a power supply 1490. A person skilled in the art may understand that the structure of the device shown in FIG. 14 does not constitute a limitation to the device, and the device may include more components or fewer components than those shown in the figure, or some components may be combined, or a different component deployment may be used.

The RF circuit 1410 may be configured to receive and send signals during an information receiving and sending process or a call process. Particularly, the RF circuit receives downlink information from a base station, then delivers the downlink information to one or more processors 1480 for processing, and sends related uplink data to the base station. Generally, the RF circuit 1410 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1410 may also communicate with a network and another device through wireless communication. The wireless communication may use any communications standard or protocol, which includes, but is not limited to, a Global System for Mobile communications (GSM), a general packet radio service (GPRS), Code Division Multiple Access (CDMA), Wideband Code Division Multiple Access (WCDMA), Long Term Evolution (LTE), an email, Short Messaging Service (SMS), and the like. The memory 1420 may be configured to store a software program and module. The processor 1480 runs the software program and the module stored in the memory 1420, to implement various functional applications and data processing. The memory 1420 may mainly include a program storage area and a data storage area. The program storage area may store an operating system, an application program required by at least one function (such as a sound playback function and an image display function), and the like. The data storage area may store data (such as audio data and an address book) created according to the use of the terminal 1400, and the like. In addition, the memory 1420 may include a high-speed random access memory, and may further include a non-volatile memory such as at least one magnetic disk storage device or a flash memory device, or another volatile solid storage device. Correspondingly, the memory 1420 may further include a memory controller, to provide access of the processor 1480 and the input unit 1430 to the memory 1420.

The input unit 1430 may be configured to receive input digit or character information, and generate a keyboard, mouse, joystick, optical, or track ball signal input related to the user setting and function control. Specifically, the input unit 1430 may include a touch-sensitive surface 1431 and another input device 1432. The touch-sensitive surface 1431, which may also be referred to as a touchscreen or a touchpad, may collect a touch operation of a user on or near the touch-sensitive surface (such as an operation of a user on or near the touch-sensitive surface 1431 by using any suitable object or accessory, such as a finger or a stylus), and drive a corresponding connection apparatus according to a preset program. In some embodiments, the touch-sensitive surface 1431 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1480. In addition, the touch controller can receive a command sent by the processor 1480 and execute the command. In addition, the touch-sensitive surface 1431 may be a resistive, capacitive, infrared, or surface sound wave type touch-sensitive surface. In addition to the touch-sensitive surface 1431, the input unit 1430 may further include the another input device 1432. Specifically, the another input device 1432 may include, but is not limited to, one or more of a physical keyboard, a functional key (such as a volume control key or a switch key), a track ball, a mouse, and a joystick.

The display unit 1440 may be configured to display information input by the user or information provided for the user, and various graphical user interfaces of the terminal 1400. These graphical user interfaces may include a graph, text, an icon, a video and any combination thereof. The display unit 1440 may include a display panel 1441. In some embodiments, the display panel 1441 may be configured by using a liquid crystal display (LCD), an organic light-emitting diode (OLED), or the like. Further, the touch-sensitive surface 1431 may cover the display panel 1441. After detecting a touch operation on or near the touch-sensitive surface 1431, the touch-sensitive surface 1431 transfers the touch operation to the processor 1480, so as to determine a type of a touch event. Then, the processor 1480 provides corresponding visual output on the display panel 1441 according to the type of the touch event. Although, in FIG. 14, the touch-sensitive surface 1431 and the display panel 1441 are used as two separate parts to implement input and output functions, but in some embodiments, the touch-sensitive surface 1431 and the display panel 1441 may be integrated to implement the input and output functions.

The terminal 1400 may further include at least one sensor 1450 such as an optical sensor, a motion sensor, and other sensors. Specifically, the optical sensor may include an ambient light sensor and a proximity sensor. The ambient light sensor may adjust luminance of the display panel 1441 according to brightness of the ambient light. The proximity sensor may switch off the display panel 1441 and/or backlight when the terminal 1400 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1400, are not further described herein.

The audio circuit 1460, a speaker 1421, and a microphone 1422 may provide audio interfaces between the user and the terminal 1400. The audio circuit 1460 may convert received audio data into an electrical signal and transmit the electrical signal to the speaker 1421. The speaker 1421 converts the electrical signal into a sound signal for output. On the other hand, the microphone 1422 converts a collected sound signal into an electrical signal. The audio circuit 1460 receives the electrical signal, converts the electrical signal into audio data, and outputs the audio data to the processor 1480 for processing. Then, the processor 1480 sends the audio data to another device by using the RF circuit 1410, or outputs the audio data to the memory 1420 for further processing. The audio circuit 1460 may further include an earplug jack, to provide communication between a peripheral earphone and the terminal 1400.

Wi-Fi belongs to a short distance wireless transmission technology. The terminal 1400 may help, through the Wi-Fi module 1470, a user to receive and send an e-mail, browse a webpage, and access stream media, and the like, which provides wireless broadband Internet access for the user. Although FIG. 14 shows the Wi-Fi module 1470, it may be understood that the Wi-Fi module 1470 is not a necessary component of the terminal 1400, and the Wi-Fi module 1470 may be omitted as required provided that the scope of the essence of the present disclosure is not changed.

The processor 1480 is the control center of the terminal 1400, and is connected to various parts of the whole device by using various interfaces and lines. By running or executing the software program and/or module stored in the memory 1420, and invoking data stored in the memory 1420, the processor 1480 performs various functions and data processing of the terminal 1400, thereby performing overall monitoring on the device. In some embodiments, the processor 1480 may include one or more processing cores. In some embodiments, the processor 1480 may integrate an application processor and a modem processor. The application processor mainly processes an operating system, a user interface, an application, and the like, and the modem processor mainly processes wireless communication. It may be understood that the foregoing modem processor may alternatively not be integrated into the processor 1480.

The terminal 1400 further includes the power supply 1490 (such as a battery) for supplying power to the components. Preferably, the power supply may be logically connected to the processor 1480 by using a power management system, thereby implementing functions such as charging, discharging, and power consumption management by using the power management system. The power supply 1490 may further include one or more of a direct current or alternating current power supply, a re-charging system, a power failure detection circuit, a power supply converter or inverter, a power supply state indicator, and any other component.

Although not shown in the figure, the terminal 1400 may further include a camera, a Bluetooth module, and the like, which are not further described herein.

In some embodiments, the memory 1420 stores at least one instruction, and the at least one instruction is loaded and executed by the processor to implement the similar picture identification method provided in the foregoing method embodiments.

Figure 15:
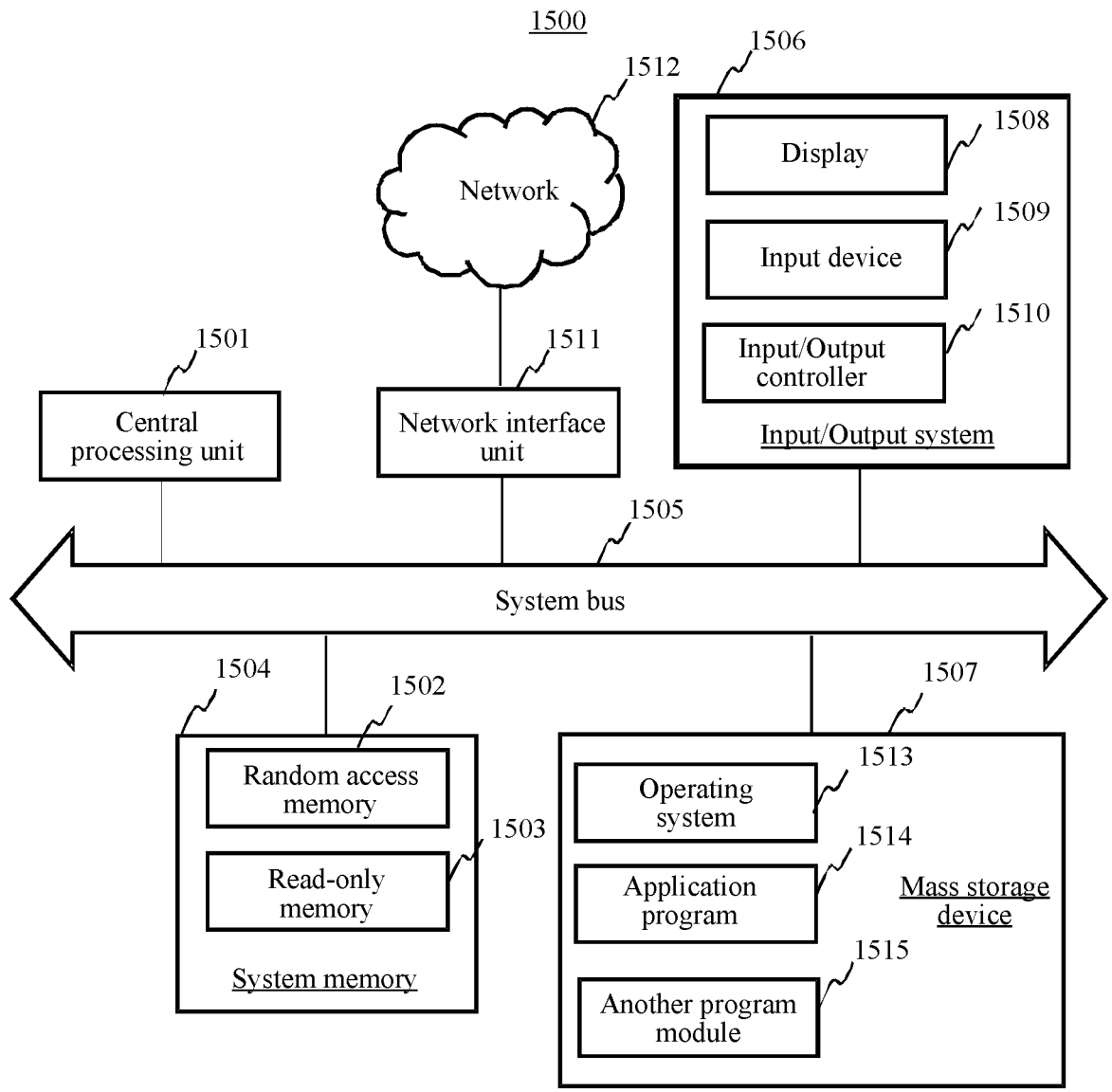
FIG. 15 is a block diagram of a server according to an embodiment of the present application.

Referring to FIG. 15, FIG. 15 is a block diagram of a server according to an embodiment of the present application. The server 1500 includes a central processing unit (CPU) 1501, a system memory 1504 including a random access memory (RAM) 1502 and a read-only memory (ROM) 1503, and a system bus 1505 connecting the system memory 1504 and the CPU 1501. The server 1500 further includes a basic input/output system (I/O system) 1506 for transmitting information between components in a computer, and a mass storage device 1507 used for storing an operating system 1513, an application program 1514, and another program module 1515.

The basic I/O system 1506 includes a display 1508 configured to display information, and an input device 1509 used by a user to input information, such as a mouse or a keyboard. The display 1508 and the input device 1509 are connected to the CPU 1501 by using an input/output controller 1510 connected to the system bus 1505. The basic I/O system 1506 may further include the input/output controller 1510, to receive and process inputs from multiple other devices, such as the keyboard, the mouse, or an electronic stylus. Similarly, the input and output controller 1510 further provides an output to a display screen, a printer or another type of output device.

The mass storage device 1507 is connected to the CPU 1501 by using a mass storage controller (not shown) connected to the system bus 1505. The mass storage device 1507 and an associated computer readable medium provide non-volatile storage for the server 1500. That is, the mass storage device 1507 may include a computer readable medium (not shown), such as a hard disk or a CD-ROM drive.

Without loss of generality, the computer readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. Certainly, a person skilled in the art may know that the computer storage medium is not limited to the foregoing types. The system memory 1504 and the mass storage device 1507 may be collectively referred to as a memory.

According to the embodiments of the present application, the server 1500 may further be connected, through a network such as the Internet, to a remote computer on the network. That is, the server 1500 may be connected to a network 1512 by using a network interface unit 1511 connected to the system bus 1505, or may be connected to another type of network or a remote computer system (not shown) by using a network interface unit 1511.

In some embodiments, the memory stores at least one instruction, and the at least one instruction is loaded and executed by the processor to implement the similar picture identification method provided in the foregoing method embodiments.

The sequence numbers of the foregoing embodiments of this application are merely for description purpose and do not indicate the preference of the embodiments.

A person of ordinary skill in the art would understand that all or some of steps in the similar picture identification method of the foregoing embodiments may be implemented using hardware (e.g., processing circuitry) or a program instructing corresponding hardware. The program may be stored in a computer-readable storage medium (e.g., a non-transitory computer-readable medium). The storage medium stores at least one instruction, at least one program, and/or a code set or an instruction set. The at least one instruction, the at least one program, and/or the code set or the instruction set can be loaded and executed by the processor to implement the similar picture identification method provided in the foregoing method embodiments.

The foregoing descriptions are merely exemplary embodiments of the embodiments of this application, but are not intended to limit the embodiments of this application. Any modification, equivalent replacement, or improvement made within the spirit and principle of the embodiments of this application shall fall within the protection scope of the embodiments of this application.

What is claimed is:

1. A similar picture identification method, comprising:
   identifying, by processing circuitry of a device, n first local regions of a first picture, the n first local regions being a first set of regions that is affine invariant;
   identifying, by the processing circuitry, m second local regions of a second picture, the m second local regions being a second set of regions that is affine invariant;
   obtaining, by the processing circuitry, n first characteristic values respectively corresponding to the n first local regions, and obtaining, by the processing circuitry, m second characteristic values respectively corresponding to the m second local regions, the first characteristic values representing feature information of the first local regions, and the second characteristic values representing feature information of the second local regions; and
   determining, according to a comparison result of the n first characteristic values and the m second characteristic values, whether the first picture is similar to the second picture, n and m being positive integers,
   wherein the determining whether the first picture is similar to the second picture comprises:
      identifying k hit regions in the first local regions, including
         determining an $i^{th}$ first local region of the n first local regions as a hit region when at least one of the second characteristic values matches a corresponding first characteristic value of the $i^{th}$ first local region, i being a positive integer less than or equal to n;
      determining a similarity score representing similarity between the first picture and the second picture according to the k hit regions, k being an integer; and
      determining that the first picture is similar to the second picture when the similarity score is greater than a similarity threshold.

2. The method according to claim 1, wherein the identifying the n first local regions of the first picture comprises:
   determining w first candidate regions in the first picture according to a maximally stable extremal region (MSER) algorithm, w being a positive integer; and
   identifying, from the w first candidate regions, the n first local regions that meet a preset condition,
   the preset condition comprising region sizes of the first local regions being between a first threshold and a second threshold, and the first threshold being less than the second threshold.

3. The method according to claim 1, wherein the identifying the in second local regions of the second picture comprises:
   determining x second candidate regions in the second picture according to a maximally stable extremal region (MSER) algorithm, x being a positive integer; and
   identifying, from the x second candidate regions, the m second local regions that meet a preset condition,
   the preset condition comprising region sizes of the second local regions being between a first threshold and a second threshold, and the first threshold being less than the second threshold.

4. The method according to claim 1, wherein
   the n first characteristic values are n first perceptual hash values,
   the m second characteristic values are m second perceptual hash values, and the determining the i$^{th}$ first local region as the hit region comprises:
separately calculating, for a first perceptual hash value of the i$^{th}$ first local region, Hamming distances between the first perceptual hash value of the i$^{th}$ first local region and the m second perceptual hash values; and
determining the i$^{th}$ first local region as the hit region when at least one of the calculated Hamming distances is less than a distance threshold.

5. The method according to claim 1, wherein the determining the similarity score representing the similarity between the first picture and the second picture according to k comprises:
determining a ratio of k to n as the similarity score.

6. The method according to claim 1, wherein the determining the similarity score comprises:
determining a ratio of an area of the k hit regions to an area of the first picture as the similarity score.

7. A computer device, comprising:
processing circuitry configured to:
identify n first local regions of a first picture, the n first local regions being a first set of regions that is affine invariant;
identify m second local regions of a second picture, the m second local regions being a second set of regions that is affine invariant;
obtain n first characteristic values respectively corresponding to the n first local regions, and obtaining m second characteristic values respectively corresponding to the m second local regions, the first characteristic values representing feature information of the first local regions, and the second characteristic values representing feature information of the second local regions; and
determine, according to a comparison result of the n first characteristic values and the m second characteristic values, whether the first picture is similar to the second picture, n and m being positive integers,
wherein the processing circuitry is configured to determine whether the first picture is similar to the second picture by performing:
identifying k hit regions in the first local regions, including
determining an i$^{th}$ first local region of the n first local regions as a hit region when at least one of the second characteristic values matches the first characteristic value of the i$^{th}$ first local region, i being a positive integer less than or equal to n;
determining a similarity score representing similarity between the first picture and the second picture according to the k hit regions, k being an integer; and
determining that the first picture is similar to the second picture when the similarity score is greater than a similarity threshold.

8. The computer device according to claim 7, wherein processing circuitry is configured to:
determine w first candidate regions in the first picture according to a maximally stable extremal region (MSER) algorithm, w being a positive integer; and
identify, from the w first candidate regions, the n first local regions that meet a preset condition,
the preset condition comprising region sizes of the first local regions being between a first threshold and a second threshold, and the first preset threshold being less than the second threshold.

9. The computer device according to claim 7, wherein the processing circuitry is configured to:
determine x second candidate regions in the second picture according to a maximally stable extremal region (MSER) algorithm, x being a positive integer; and
identify, from the x second candidate regions, the m second local regions that meet a preset condition,
the preset condition comprising region sizes of the second local regions being between a first threshold and a second threshold, and the first threshold being less than the second threshold.

10. The computer device according to claim 7, wherein the n first characteristic values are n first perceptual hash values,
the m second characteristic values are m second perceptual hash values, and
the processing circuitry is configured to:
separately calculate, for a first perceptual hash value of the itis first local region, Hamming distances between the first perceptual hash value of the i$^{th}$ first local region and the m second perceptual hash values; and
determine the itis first local region as the hit region when at least one of the calculated Hamming distances is less than a distance threshold.

11. The computer device according to claim 7, wherein the processing circuitry is configured to:
determine a ratio of k to n as the similarity score.

12. The computer device according to claim 7, wherein the processing circuitry is configured to:
determine a ratio of an area of the k hit regions to an area of the first picture as the similarity score.

13. A method of determining picture key characteristics of a picture, comprising:
identifying, by processing circuitry of a device, n local regions in the picture, n being a positive integer;
converting the n local regions into n grayscale pictures of a predetermined size:
calculating, by the processing circuitry, n respective fingerprints respectively corresponding to the picture key characteristics in the n local regions, comprising:
performing discrete cosine transform (DCT) on the n grayscale pictures, to obtain n sets of DCT coefficient values of the n local regions;
obtaining n sample regions that respectively correspond to the n local regions from the n sets of DCT coefficient values; and
calculating the n fingerprints corresponding to the n local regions according to the n sample regions;
grouping the fingerprints and the local regions in association with the picture; and
outputting a table that stores a result of the grouping.

14. The method according to claim 13, wherein the identifying the n local regions comprises:
determining w candidate regions in the picture according to a maximally stable extremal region (MSER) algorithm, w being a positive integer; and
identifying, from the w first candidate regions, then local regions that meet a preset condition,
the preset condition comprising region sizes of the n local regions being between a first threshold and a second threshold, and the first threshold being less than the second threshold.

15. The method according to claim 14, wherein a region size of the n local regions ranges from 32*32 to 200*200.

16. The method according to claim 13, wherein the n fingerprints are n perceptual hash values calculated according to the n sample regions.

17. A method of determining picture similarity, comprising:
  determining, by processing circuitry of a device, a first picture-level characteristic value of a first picture;
  determining, by the processing circuitry of the device, second picture-level characteristic values of second pictures, respectively:
  calculating respective picture-level hamming distances between the first picture-level characteristic value and the second picture-level characteristic values;
  determining whether at least one of the picture-level hamming distances is less than a first threshold;
  in response to the at least one of the picture-level hamming distances being determined as less than the first threshold, identifying a picture similar to the first picture from at least one of the second pictures that corresponds to the at least one of the picture-level hamming distances less than the first threshold; and
  in response to none of the picture-level hamming distances being determined as less than the first threshold, performing;
    deriving a set of first region-level characteristic values of the first picture by identifying first key regions in the first picture according to a maximally stable extremal region (MSER) algorithm and calculating the first region-level characteristic values respectively corresponding to the first key regions according to a perceptual hash algorithm;
    for each one of the second pictures, deriving a respective set of second region-level characteristic values of the corresponding second picture by identifying a respective set of second key regions in the corresponding second picture according to the MSER algorithm and calculating the respective set of second region-level characteristic values corresponding to the respective set of second key regions of the corresponding second picture according to the perceptual hash algorithm;
    calculating region-level hamming distances between the first set of region-level characteristic values and the respective sets of second region-level characteristic values; and
    identifying the picture similar to the first picture from the second pictures according to the region-level hamming distances.

18. The method according to claim 17, wherein
the first set of region-level characteristic values is determined according to grayscale values of the first picture, and
each set of the sets of second region-level characteristic values is determined according to grayscale values of the corresponding one of the second pictures.

19. The method according to claim 17, wherein
the first picture-level characteristic value of the first picture is determined according to the perceptual hash algorithm, and
each one of the second picture-level characteristic values of the corresponding one of the second pictures is determined according to the perceptual hash algorithm.

* * * * *